(12) United States Patent
Sells

(10) Patent No.: US 8,125,808 B2
(45) Date of Patent: Feb. 28, 2012

(54) THREE-PHASE LOW-LOSS RECTIFIER

(75) Inventor: Troy Woodrow Sells, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 381 days.

(21) Appl. No.: 12/567,840

(22) Filed: Sep. 28, 2009

(65) Prior Publication Data

US 2011/0075460 A1    Mar. 31, 2011

(51) Int. Cl.
H02M 7/127    (2006.01)
(52) U.S. Cl. ....................................... 363/127
(58) Field of Classification Search .............. 363/81, 363/84, 125, 127
See application file for complete search history.

(56) References Cited

U.S. PATENT DOCUMENTS

| | | | |
|---|---|---|---|
| 4,139,880 A | 2/1979 | Ulmer et al. | |
| 4,423,456 A | 12/1983 | Zaidenweber | |
| 4,447,868 A * | 5/1984 | Turnbull | 363/81 |
| 4,449,176 A | 5/1984 | Turnbull | |
| 4,774,650 A | 9/1988 | Kahkipuro et al. | |
| 4,825,351 A | 4/1989 | Uesugi | |
| 5,268,833 A | 12/1993 | Axer | |
| 5,510,972 A | 4/1996 | Wong | |
| 5,623,550 A | 4/1997 | Killion | |
| 5,648,705 A | 7/1997 | Sitar et al. | |
| 5,793,167 A | 8/1998 | Liang et al. | |
| 5,808,882 A | 9/1998 | Mochikawa | |
| 5,870,031 A | 2/1999 | Kaiser et al. | |
| 5,991,182 A | 11/1999 | Novac et al. | |
| 6,147,545 A | 11/2000 | Marshall | |
| 6,215,271 B1 | 4/2001 | Lerow et al. | |
| 6,320,448 B1 | 11/2001 | Gantioler | |
| 6,353,307 B1 | 3/2002 | Koelle et al. | |
| 6,421,261 B1 | 7/2002 | Fujisawa et al. | |
| 6,549,438 B2 | 4/2003 | Malone | |

(Continued)

FOREIGN PATENT DOCUMENTS

EP    1519476    3/2005

(Continued)

OTHER PUBLICATIONS

U.S. Appl. No. 12/636,034, filed Dec. 11, 2009, entitled "N-Phase Active Bridge Circuits Including N-Channel Field Effect Transistors With Active Gate Drive" to Sells, T.

(Continued)

*Primary Examiner* — Adolf Berhane
(74) *Attorney, Agent, or Firm* — Fox Rothschild, LLP; Robert J. Sacco

(57) ABSTRACT

A three-phase bridge rectifier circuit (TPBRC) connectable to an AC voltage source (102, 104, 106) via input lines (151, 153, 155) and to a load (199) via output lines (159, 157). The AC voltage source supplies the TPBRC (100) with AC voltage waveforms (302, 304, 306) that differ in phase by a certain amount. The TPBRC includes three series transistor combinations (110/112, 114/116, 118/120) connected across the output lines. A plurality of diodes (190, 128, 198, 148, 113, 168) are connected between a drain (152, 122, 162, 132, 172, 142) of one of the field effect transistors (110, 112, 114, 116, 118, 120) and a gate (154, 124, 164, 134, 174, 144) of a different one of the field effect transistors. A voltage divider (192/188, 130/140, 107/196, 150/160, 115/111, 170/180) and a voltage clamping device (194, 138, 109, 158, 119, 178) is provided for each field effect transistor.

18 Claims, 18 Drawing Sheets

U.S. PATENT DOCUMENTS

| | | |
|---|---|---|
| 6,563,726 B1 | 5/2003 | Hirst |
| 6,661,208 B2 | 12/2003 | Rutter et al. |
| 7,084,609 B2 | 8/2006 | Pillote et al. |
| 7,269,038 B2 | 9/2007 | Shekhawat et al. |
| 7,292,445 B2 | 11/2007 | Linke |
| 7,339,804 B2 | 3/2008 | Uchida |
| 7,388,404 B1 | 6/2008 | Miller |
| 7,411,768 B2 | 8/2008 | Sells |
| 7,420,224 B2 | 9/2008 | Milich et al. |
| 7,443,142 B2 | 10/2008 | O'Gorman et al. |
| 7,478,254 B2 | 1/2009 | Kawai |
| 7,561,404 B2 | 7/2009 | Sells |
| 7,920,393 B2 * | 4/2011 | Bendre et al. ............ 363/39 |
| 8,045,350 B2 * | 10/2011 | Sells ............ 363/81 |
| 2003/0095423 A1 | 5/2003 | Hirst |
| 2005/0024033 A1 | 2/2005 | Nakata |
| 2007/0170903 A1 | 7/2007 | Apfel |
| 2007/0171690 A1 | 7/2007 | Apfel |
| 2007/0296363 A1 | 12/2007 | Andrejak et al. |
| 2008/0291699 A1 | 11/2008 | Sells |
| 2009/0273959 A1 | 11/2009 | Sells |
| 2010/0046259 A1 | 2/2010 | Ho et al. |
| 2010/0046264 A1 | 2/2010 | Ho et al. |
| 2011/0075461 A1 * | 3/2011 | Sells ............ 363/127 |

FOREIGN PATENT DOCUMENTS

| | | |
|---|---|---|
| WO | WO-97/24795 | 7/1997 |

OTHER PUBLICATIONS

U.S. Appl. No. 12/567,847, filed Sep. 28, 2009, entitled "Three-Phase Low-Loss Rectifier With Active Gate Drive", to Sells, T.

European Search Report mailed May 3, 2011, European Application No. 10015390.7-2207.

Information about Related Patents and Patent Applications, see section 6 of the accompanying Information Disclosure Statement Letter, which concerns Related Patents and Patent Applications.

* cited by examiner

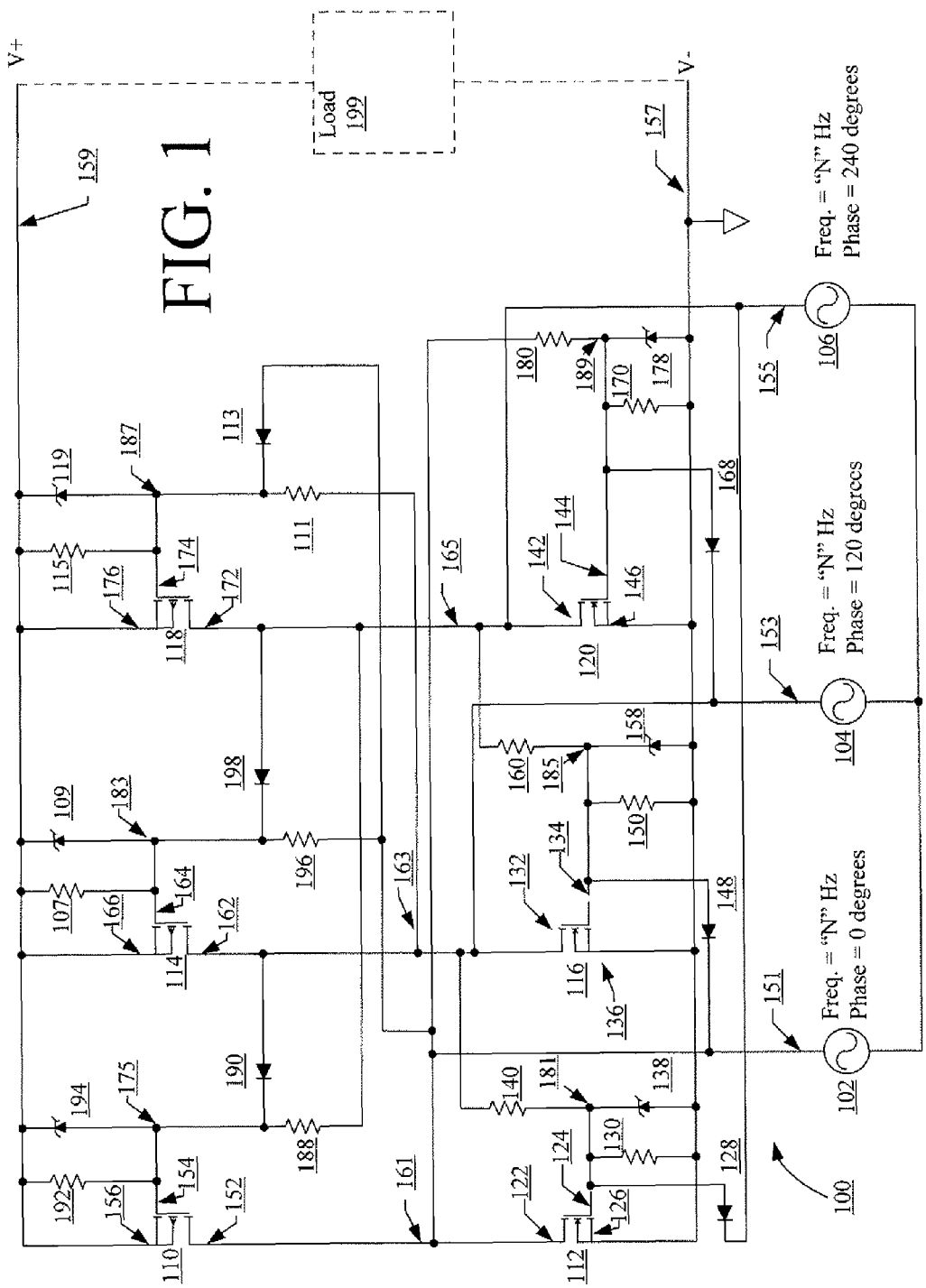

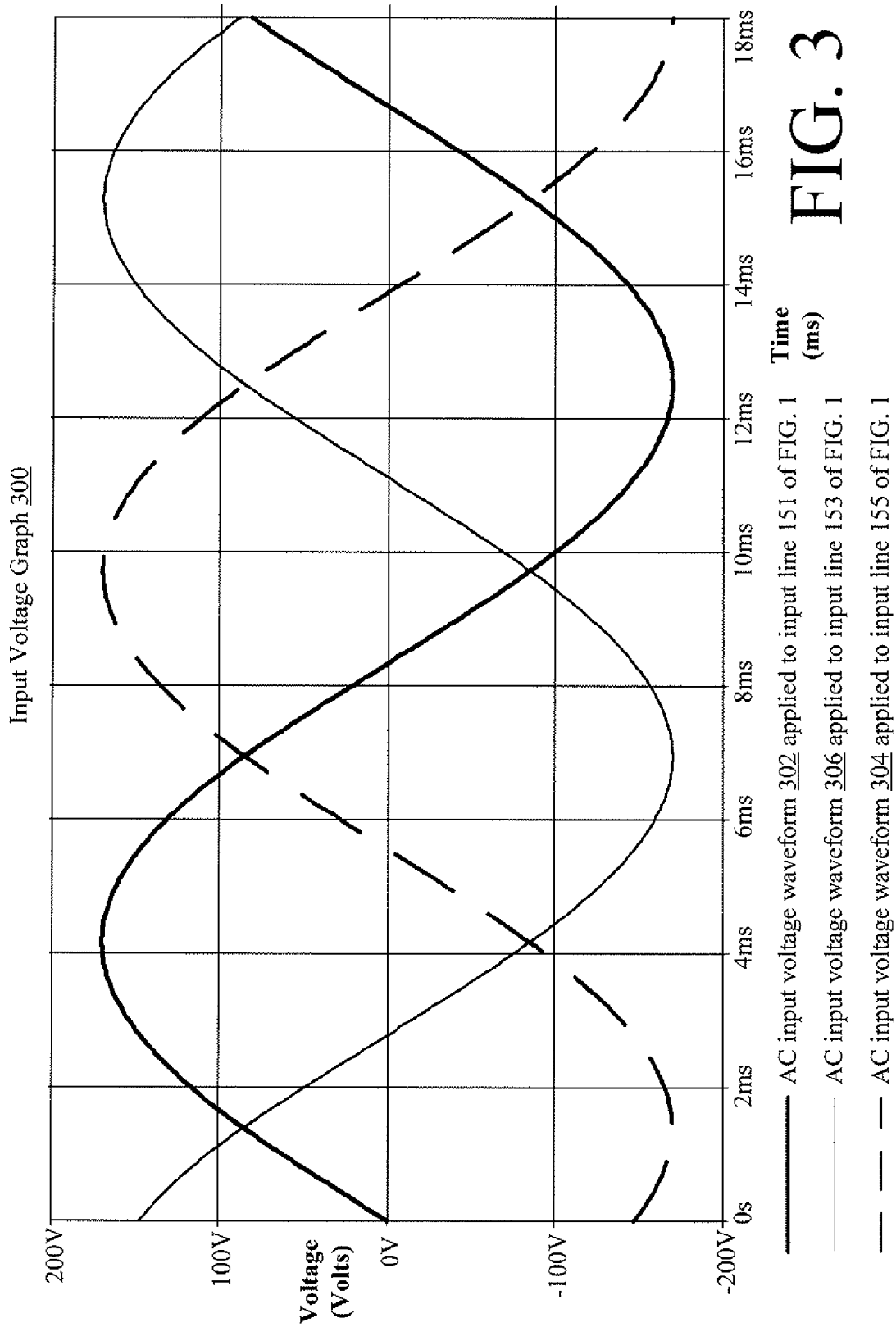

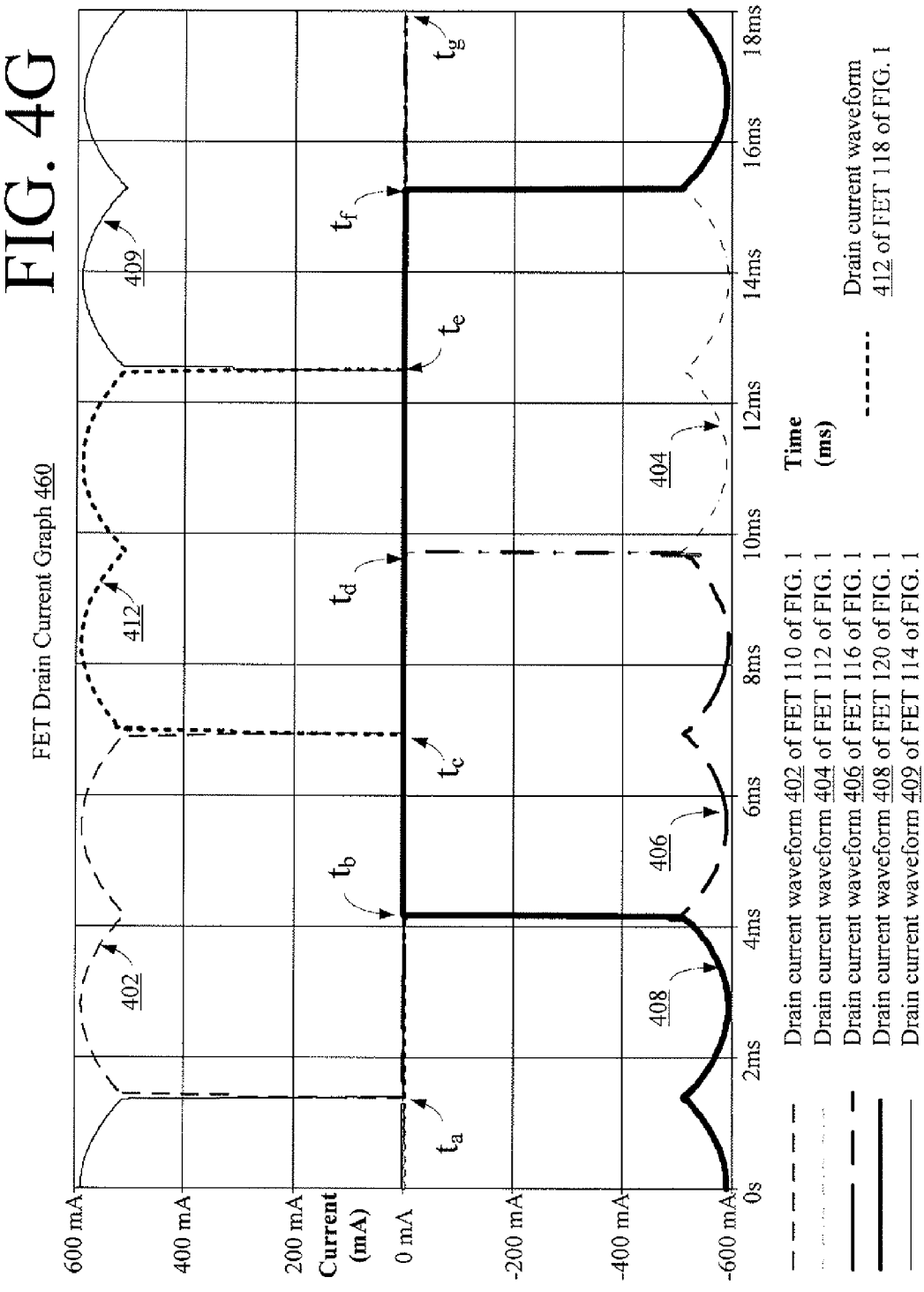

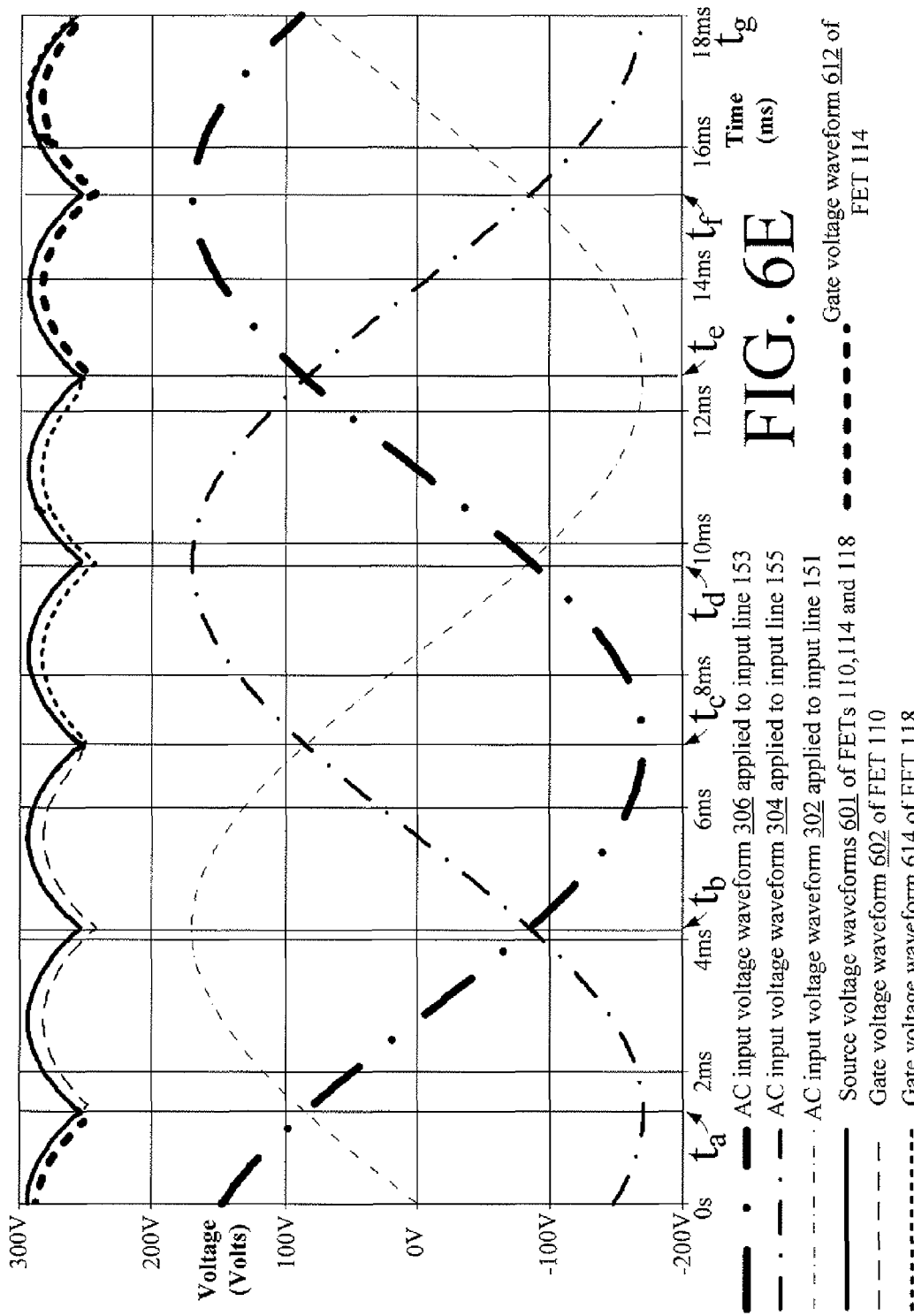

Ground-referenced waveform 702 measured at the drain 162 of FET 114 of FIG. 1

Ground-referenced waveform 704 measured at the drain 152 of FET 110 of FIG. 1

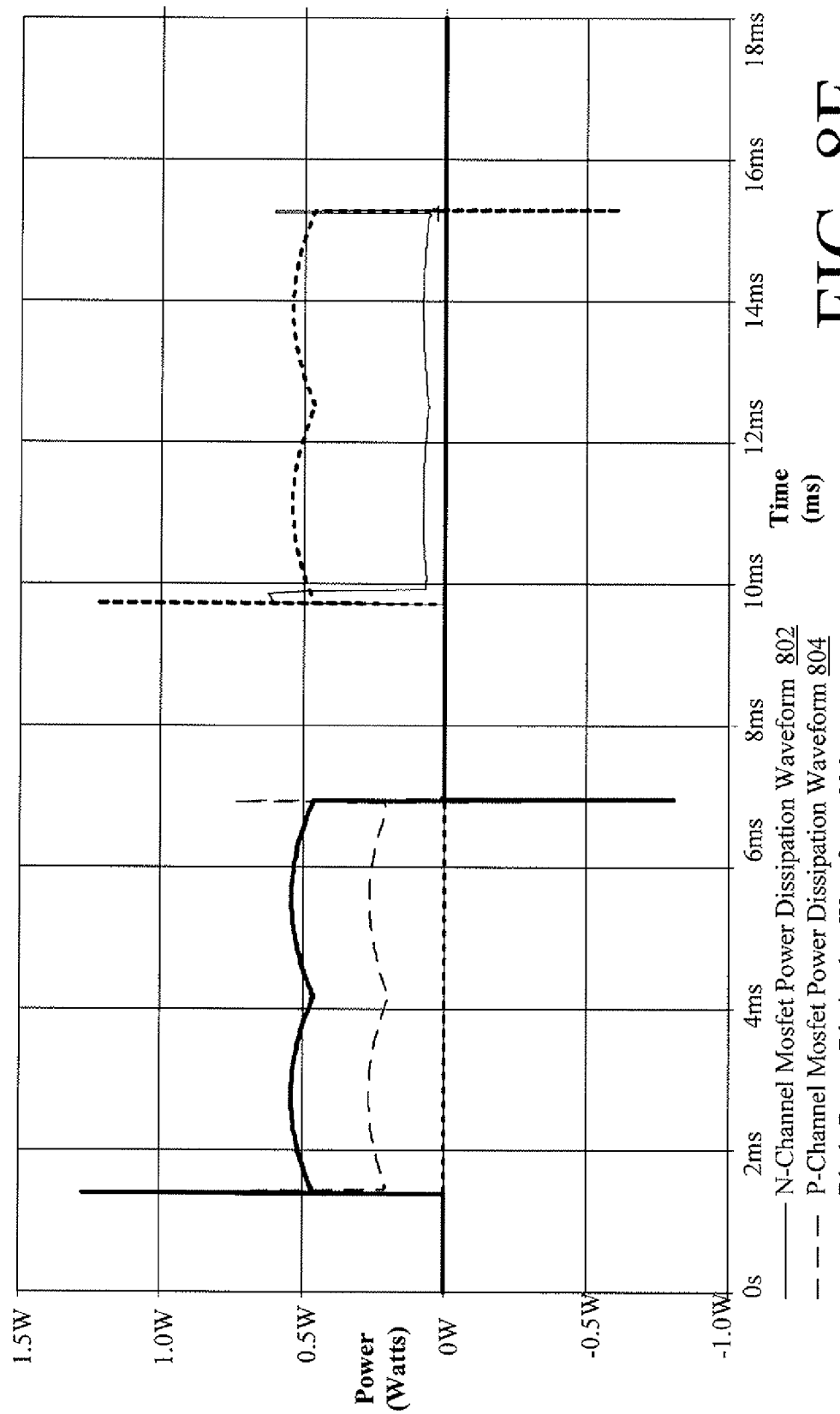

THREE-PHASE LOW-LOSS RECTIFIER

BACKGROUND OF THE INVENTION

1. Statement of the Technical Field

The inventive arrangements relate to Metal-Oxide-Semiconductor Field-Effect Transistor (MOSFET) circuits, and more particularly to a circuit for Alternating Current (AC) voltage rectification.

2. Description of the Related Art

Three-phase bridge rectifier type devices are typically used to convert a three-phase AC waveform into a Direct Current (DC) waveform. A schematic illustration of a conventional three-phase bridge rectifier type device is shown in FIG. 9. The three-phase bridge rectifier type devices are supplied three (3) AC voltages that differ in phase by one-third (⅓) of a cycle or one hundred twenty degrees (120°). Such three-phase bridge rectifier type devices often utilize a plurality of three-phase bridge connected diodes to perform the rectification function. The three-phase bridge connected diodes include three positive side diodes and three negative side diodes. During operation, only those diodes belonging to the phases indicative of peak values of the three-phase AC voltages at the respective positive and negative sides are turned on. In effect, a three-phase AC waveform is rectified by the three-phase bridge rectifier circuit. After the three-phase AC waveform is rectified, the output signal is often filtered to remove unwanted spectral content and to produce a DC voltage. A filtering device utilizing capacitor components, resistor components, and/or inductor components is typically used for this purpose.

Despite the various technologies known in the art, there remains a need for a MOSFET bridge rectifier type device that can rectify a domestic three-phase AC mains (for example, 208V, 60 Hz) and/or a foreign three-phase AC mains (for example, 400V, 50 Hz) with low power loss.

SUMMARY OF THE INVENTION

Embodiments of the present invention concern three-phase transistor active bridge circuits. The three-phase transistor active bridge circuits rectify domestic three-phase AC mains (for example, 208V, 60 Hz) and/or a foreign three-phase AC mains (for example, 400V, 50 Hz) with low power loss. The three-phase transistor active bridge circuits are connectable to a three-phase AC voltage source via a plurality of input lines. The three-phase AC voltage source is configured to supply the three-phase bridge rectifier circuit with a plurality of AC voltage waveforms that differ in phase by a certain amount (e.g., 120°). The three-phase transistor active bridge circuits are also connectable to a load via a pair of output lines.

Each of the three-phase bridge rectifier circuits includes a plurality of field effect transistors. A source-drain path of a first field effect transistor is connected in series with a source-drain path of a second field effect transistor to form a first series transistor combination connected across the pair of output lines. A first input line of the plurality of input lines is connected to the drains of the first and second field effect transistors. A source-drain path of a third field effect transistor is connected in series with a source-drain path of a fourth field effect transistor to form a second series transistor combination connected across the pair of output lines. A second input line of the plurality of input lines is connected to the drains of the third and fourth field effect transistors. A source-drain path of a fifth field effect transistor is connected in series with a source-drain path of a sixth field effect transistor to form a third series transistor combination connected across the pair of output lines. A third input line of the plurality of input lines is connected to the drains of the fifth and sixth field effect transistors.

Each of the first, third and fifth field effect transistors is of a first channel type. Each of the second, fourth and sixth field effect transistors is of a second channel type. The first channel type is different from the second channel type. Each of the field effect transistors can include, but is not limited to, a MOSFET type device and/or an enhancement mode field effect transistor. Notably, each of the first, third and fifth field effect transistors is switched to its "off" state before a respective second, fourth and sixth field effect transistor is switched to its "on" state, and vise versa. Consequently, cross conduction of each series transistor combination does not occur during the "on/off" state transitions thereof.

Each of the three-phase bridge rectifier circuits also includes a plurality of diodes. Each of the diodes is connected between a drain of one of the field effect transistors and a gate of a different one of the field effect transistors. For example, a first diode is connected between a drain of the third field effect transistor and a gate of the first field effect transistor. As a result of the inclusion of these diodes, each of the first, second, third, fourth, fifth and sixth field effect transistors remains in its "off" state until a rising edge of a first ground-referenced waveform intersects a falling edge of a second ground-referenced waveform of a different one of the field effect transistors of the same channel type. Each of the first and second ground-referenced waveforms represents an input voltage waveform supplied to a three-phase bridge rectifier circuit. Each of the first and second ground-referenced waveforms can be measured at a drain of a respective one of the field effect transistors.

Each of the three-phase bridge rectifier circuits further includes a voltage divider for each of the field effect transistors. The voltage divider includes a first resistor and a second resistor connected in series from a source of each the field effect transistor to one of the input lines. A voltage clamping device is connected between the gate and a source of each respective one of the field effect transistors.

BRIEF DESCRIPTION OF THE DRAWINGS

Embodiments will be described with reference to the following drawing figures, in which like numerals represent like items throughout the figures, and in which:

FIG. 1 is a schematic representation of three-phase bridge rectifier circuit.

FIG. 3 is a time graph showing three (3) AC input voltage waveforms of the three-phase bridge rectifier circuit shown in FIG. 1.

FIG. 4G is a time graph showing each of the drain current waveforms shown in FIGS. 4A-4F that is useful for understanding when each field effect transistor of FIG. 1 is switched to its "on" state relative to the other field effect transistors.

FIG. 6E is a time graph showing that a FET "on/off" state transition process is at least partially defined by the polarity of the AC voltage waveforms shown in FIG. 3 and the intersection thereof.

FIG. 8E is a time graph showing the power dissipation waveforms of FIGS. 8A-8D overlapping each other.

DETAILED DESCRIPTION

Figure 5:
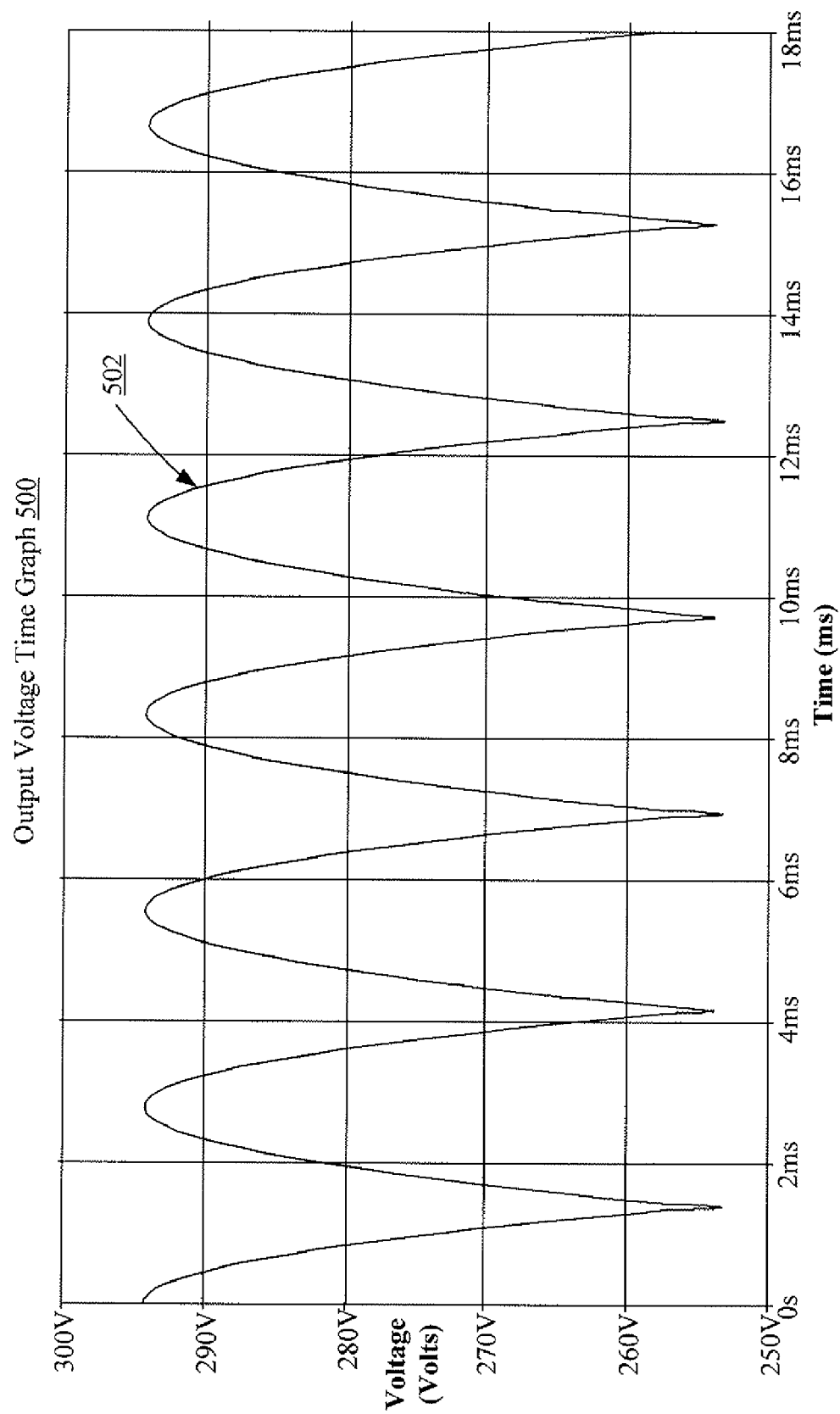
FIG. 5 is a time graph showing a DC output voltage waveform of the three-phase bridge rectifier circuit shown in FIG. 1.

A three-phase bridge rectifier circuit 100 is shown in FIG. 1. The circuit 100 shown is useful for a variety of purposes, including rectification of a domestic three-phase AC mains (for example, 208V, 60 Hz) and/or a foreign three-phase AC mains (for example, 400V, 50 Hz) with low power loss. As may be observed in FIG. 1, the circuit 100 is supplied three (3) AC voltages that differ in phase by one-third (⅓) of a cycle or one hundred twenty degrees (120°). As such, the circuit 100 is connectable to at least one AC voltage source 102, 104, 106 via three (3) input lines 151, 153, 155. The AC voltage sources 102, 104 and 106 shown in FIG. 1 can collectively comprise a single three-phase AC voltage source (e.g., a three-phase transformer). In this scenario, the circuit 100 is supplied with a first AC voltage waveform having a phase shift of zero degrees (0°), a second AC voltage waveform having a phase shift of one hundred twenty degrees (120°), and a third AC voltage waveform having a phase shift of two hundred forty degrees (240°). Each of the AC voltage waveforms has the same frequency "N" expressed in Hertz (e.g., 60 Hz). An input voltage time graph 300 showing exemplary AC input voltage waveforms 302, 304, 306 supplied to the circuit 100 by AC voltage source(s) 102, 106, 104 is provided in FIG. 3. Notably, the AC input voltage waveforms 302, 304, 306 are measured differentially across the AC voltage source(s) 102, 106, 104 and not with respect to ground. The circuit 100 is also connectable between a pair of output lines 159, 157. The output lines 159, 157 can be connected across a load 199 so that the load 199 can be supplied a DC output voltage of the circuit 100. An output voltage graph 500 showing an exemplary output voltage waveform 502 of the circuit 100 is provided in FIG. 5.

As shown in FIG. 1, the circuit 100 includes field effect transistors 110, 114, 118 of a first channel type. The circuit 100 also includes field effect transistors 112, 116, 120 of a second channel type that is different from the first channel type. For example, the field effect transistors 110, 114, 118 can be a P-channel type, whereas the field effect transistors 112, 116, 120 can be an N-channel type. Each of the field effect transistors 110, 112, 114, 116, 118, 120 can be enhancement mode devices. For example, the N-channel type transistor can be model number IXTM24N50, which is available from IXYS Corporation of Milpitas, Calif. The P-channel device can be IXTH11P50, which is also available from IXYS Corporation of Milpitas, Calif. Still, it should be understood that other types of field effect transistors can also be selected depending upon the anticipated voltage and current handling requirements of circuit 100.

As will be understood by those having ordinary skill in the art, each of the field effect transistors 110, 112, 114, 116, 118, 120 will have three (3) terminals respectively defined as a source, gate and drain. With regard to field effect transistor 110, the source, gate and drain terminals are respectively identified with reference numbers 156, 154 and 152. The source, gate and drain terminals of field effect transistors 114 and 118 are respectively identified as 166, 164, 162 and 176, 174, 172. With regard to the field effect transistor 112, the source, gate and drain terminals are respectively identified with reference numbers 126, 124, 122. The source, gate and drain terminals of field effect transistors 116 and 120 are respectively identified as 136, 134, 132 and 146, 144, 142.

Figures 2A, 2B:
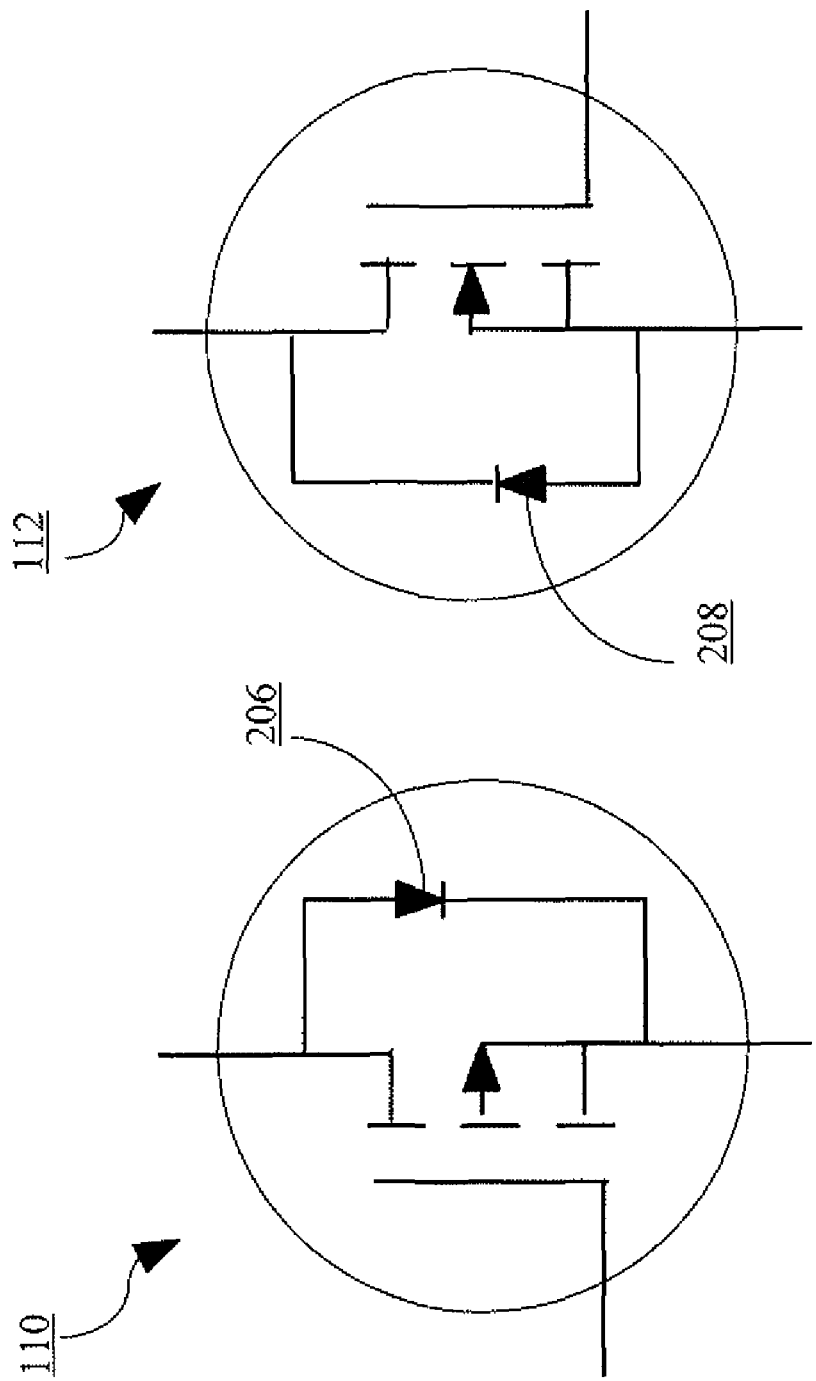
FIG. 2A is a schematic representation of a P-channel MOSFET having an intrinsic body diode.
FIG. 2B is a schematic representation of an N-channel MOSFET having an intrinsic body diode.

An electrical path can be provided from the source to the drain of each field effect transistor 110, 112, 114, 116, 118, 120. This path is generally referred to herein as the source-drain path. Although not always shown in schematic illustrations, field effect transistor devices, such as MOSFETs, typically have an intrinsic body diode that results from the manner in which the field effect transistor devices are manufactured. This intrinsic body diode 206, 208 is illustrated in FIGS. 2A and 2B for a P-channel MOSFET 110 and an N-channel MOSFET 112.

Referring again to FIG. 1, it can be observed that a source-drain path of field effect transistor 110 can be connected in series with a source-drain path of the field effect transistor 112. The series connected transistor pair 110, 112 form a first series transistor combination that can be connected across the output lines 159, 157. A source-drain path of the field effect transistor 114 can be connected in series with a source-drain path of the field effect transistor 116 to form a second series transistor combination connected across the output lines 159, 157. A source-drain path of the field effect transistor 118 can be connected in series with a source-drain path of the field effect transistor 120 to form a third series transistor combination connected across the output lines 159, 157.

As noted above, the circuit 100 has three (3) input lines 151, 153, 155 electrically coupled to at least one AC voltage source 102, 104, 106. A first one of the input lines 151 is connected to the first series combination 110, 112 at an interconnection point 161 between the field effect transistors 110, 112. A second one of the input lines 153 can be connected to the second series combination 114, 116 at an interconnection point 163 between the field effect transistors 114, 116. A third one of the input lines 155 can be connected to the third series combination 118, 120 at an interconnection point 165 between the field effect transistors 118, 120.

A voltage divider circuit can be provided for each of the field effect transistors 110, 112, 114, 116, 118, 120. The voltage divider circuit can be comprised of a first resistor and a second resistor connected in series. However, those having ordinary skill in the art will appreciate that numerous different types of voltage dividers circuits are possible and can be used for the purposes as hereinafter described. The voltage divider circuit for the field effect transistor 110 can include first resistor 192 and second resistor 188. The voltage divider circuit for the field effect transistor 114 can include a first resistor 107 and a second resistor 196. The voltage divider circuit for the field effect transistor 118 can include a first resistor 115 and a second resistor 111. The voltage divider circuit for the field effect transistor 112 can include first resistor 130 and a second resistor 140. The voltage divider circuit for the field effect transistor 116 can include a first resistor 150 and a second resistor 160. The voltage divider circuit for the field effect transistor 120 can include a first resistor 170 and a second resistor 180.

In FIG. 1, the first and second resistors are connected in series from a source 156, 126, 166, 136, 176, 146 of each field effect transistor 110, 112, 114, 116, 118, 120 to one of the input lines 151, 153, 155. For example, the resistor combination 192, 188 is connected to source 156 of field effect transistor 110 to input line 155. The resistor combination 130, 140 is connected to source 126 of field effect transistor 112 to input line 153. The resistor combination 107, 196 is connected to source 166 of field effect transistor 114 to input line 151. The resistor combination 150, 160 is connected to source 136 of field effect transistor 116 to input line 155. The resistor combination 115, 111 is connected to source 176 of field effect transistor 118 to input line 153. The resistor combination 170, 180 is connected to source 146 of field effect transistor 120 to input line 151.

Each voltage divider advantageously provides a bias voltage tap 175, 181, 183, 185, 187, 189. For example, if a resistive voltage divider is used as shown in FIG. 1, then the bias voltage tap can be provided at a connection point between the first and second resistors. The bias voltage tap 175, 181, 183, 185, 187, 189 of each voltage divider is connected to a gate 154, 124, 164, 134, 174, 144 of each respective one of the field effect transistors 110, 112, 114, 116, 118, 120. Consequently, the voltage at bias voltage tap 175, 181, 183, 185, 187, 189 is a substantially reduced voltage output relative to the input voltage applied to the voltage divider circuit 100 by AC voltage source(s) 102, 104, 106. For example, the voltage at bias voltage tap of the voltage divider is reduced by ten percent (10%) to ninety percent (90%) relative to the input voltage.

Notably, the circuit 100 is not limited to any particular range of voltage reduction by the voltage divider. The purpose of the voltage divider is to permit a relatively larger range of input voltages to be applied to the circuit 100 via input lines 151, 153, 155 without producing excessively high voltage levels between the gate 154, 124, 164, 134, 174, 144 and source 156, 126, 166, 136, 176, 146 of each field effect transistor 110, 112, 114, 116, 118, 120. However, the voltage divider should still produce a bias voltage between each transistor gate 154, 124, 164, 134, 174, 144 and a respective source 156, 126, 166, 136, 176, 146 that is of sufficient magnitude to self bias each transistor for a predetermined range of input voltages applied to the circuit 100 via the input lines 151, 153, 155. For example, the first resistor 192, 130, 107, 150, 115, 170 can be selected to be about one hundred kilo Ohms (100 kΩ) and the second resistor 188, 140, 196, 160, 111, 180 can be selected to be about fifty kilo Ohms (50 kΩ). Still, those having ordinary skill in the art will appreciate that a variety of other voltage divider values can and should be used depending upon the design criteria for input voltage range and transistor specifications.

The circuit 100 can also include a voltage clamping circuit to ensure that the voltage applied, gate-to-source, across each of the field effect transistors 110, 112, 114, 116, 118, 120 does not become excessively large as the three-phase AC input voltage is increased. Any suitable voltage clamping circuit can be used for this purpose. For example, the voltage clamp could be simply implemented as a zener diode 194, 138, 109, 158, 119, 178 that is connected in parallel with first resistor 192, 130, 107, 150, 115, 170 between the gate 154, 124, 164, 134, 174, 144 and the source 156, 126, 166, 136, 176, 146 of each respective one of the field effect transistors 110, 112, 114, 116, 118, 120.

The zener diodes 194, 138, 109, 158, 119, 178 can ensure that the voltage between the gate terminals 154, 124, 164, 134, 174, 144 and source terminals 156, 126, 166, 136, 176, 146 is limited. For example, each of the zener diodes 194, 138, 109, 158, 119, 178 can prevent the voltage between the gate 154, 124, 164, 134, 174, 144 and source 156, 126, 166, 136, 176, 146 of a respective field effect transistor 110, 112, 114, 116, 118, 120 from exceeding a predetermined threshold voltage defined by the reverse breakdown voltage of the zener diode 194, 138, 109, 158, 119, 178. A further advantage of using a voltage clamp as described herein is it allows adequate bias voltage levels to be developed between the gate 154, 124, 164, 134, 174, 144 and the source 156, 126, 166, 136, 176, 146 of each field effect transistor 110, 112, 114, 116, 118, 120, even with relatively low input voltages applied to the circuit via input lines 151, 153, 155. For example, the voltage divider can be designed to allow a relatively large proportion of the input voltage (e.g., 70%) to appear at bias voltage tap 175, 181, 183, 185, 187, 189. The larger proportion of voltage ensures that the field effect transistors 110, 112, 114, 116, 118, 120 will be biased to their "on" state, even with relatively low input voltages from the AC voltage source(s) 102, 104, 106. In order to ensure that this larger proportion of voltage does not damage the field effect transistors 110, 112, 114, 116, 118, 120 when considerably higher input voltages are applied to the circuit 100, the clamping circuit (zener diode 194, 138, 109, 158, 119, 178 in FIG. 1) can clamp the output of the voltage divider at a predetermined level.

The circuit 100 further includes a plurality of devices for ensuring that each of the field effect transistors 110, 112, 114, 116, 118, 120 is switched to its "on" state at desirable times. These devices can include, but are not limited to, diodes 190, 128, 198, 148, 113, 168. A first diode 190 is connected between the AC voltage source 104 to the gate 154 of the field effect transistor 110. A third diode 198 is connected between the AC voltage source 106 and the gate 164 of the field effect transistor 114. A fifth diode 113 is connected between the AC voltage source 102 and the gate 174 of the field effect transistor 118. A second diode 128 is connected between the AC voltage source 106 and the gate 124 of the field effect transistor 112. A fourth diode 148 is connected between the AC voltage source 102 and the gate 134 of the field effect transistor 116. A sixth diode 168 is connected between the AC voltage source 104 and the gate 144 of the field effect transistor 120. The importance of theses diodes 190, 128, 198, 148, 113, 168 will become clear in the discussion below regarding the detailed operation of the circuit 100.

Figure 4A:
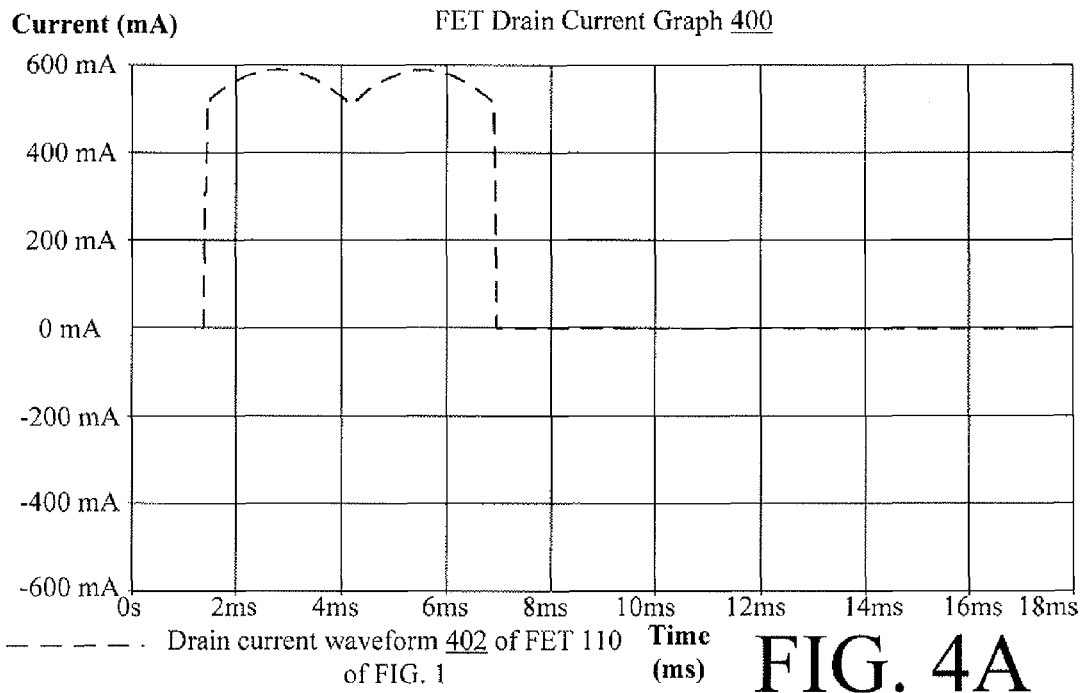
FIG. 4A is a time graph showing an exemplary drain current waveform for a field effect transistor shown in FIG. 1.
Figure 4B:
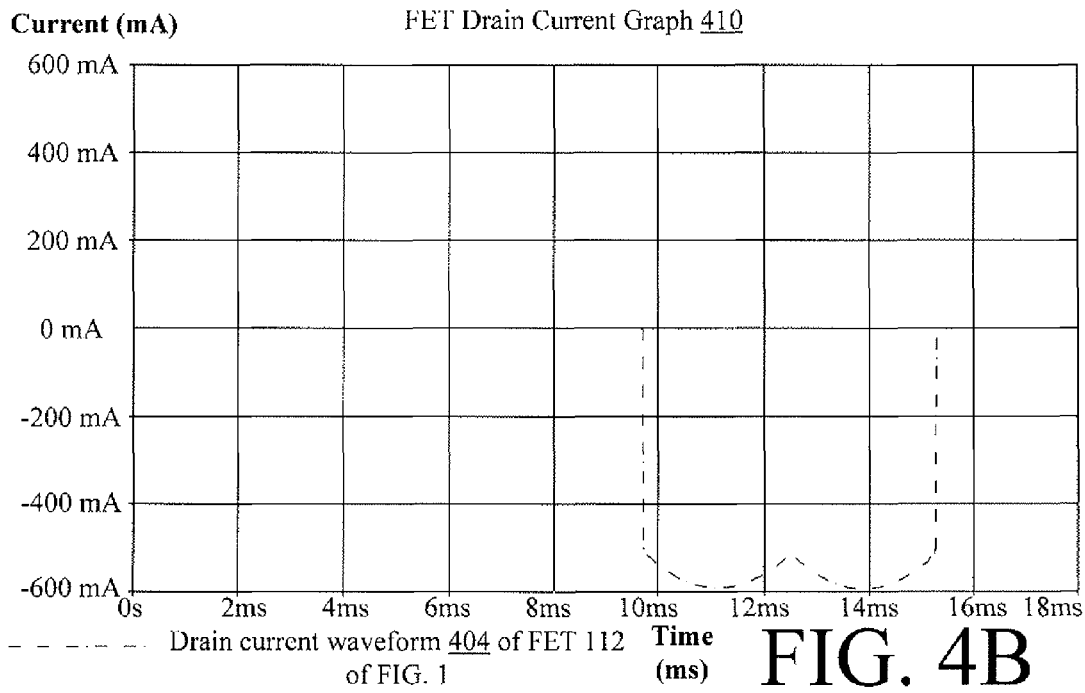
FIG. 4B is a time graph showing an exemplary drain current waveform for a field effect transistor shown in FIG. 1.
Figure 4C:
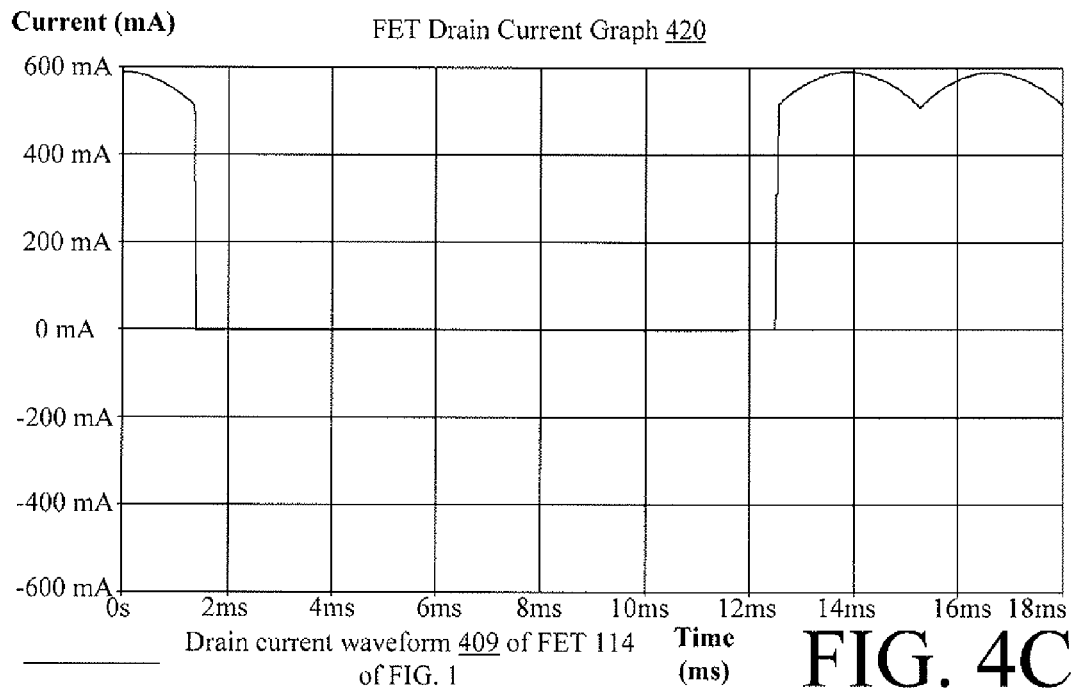
FIG. 4C is a time graph showing an exemplary drain current waveform for a field effect transistor shown in FIG. 1.
Figure 4D:
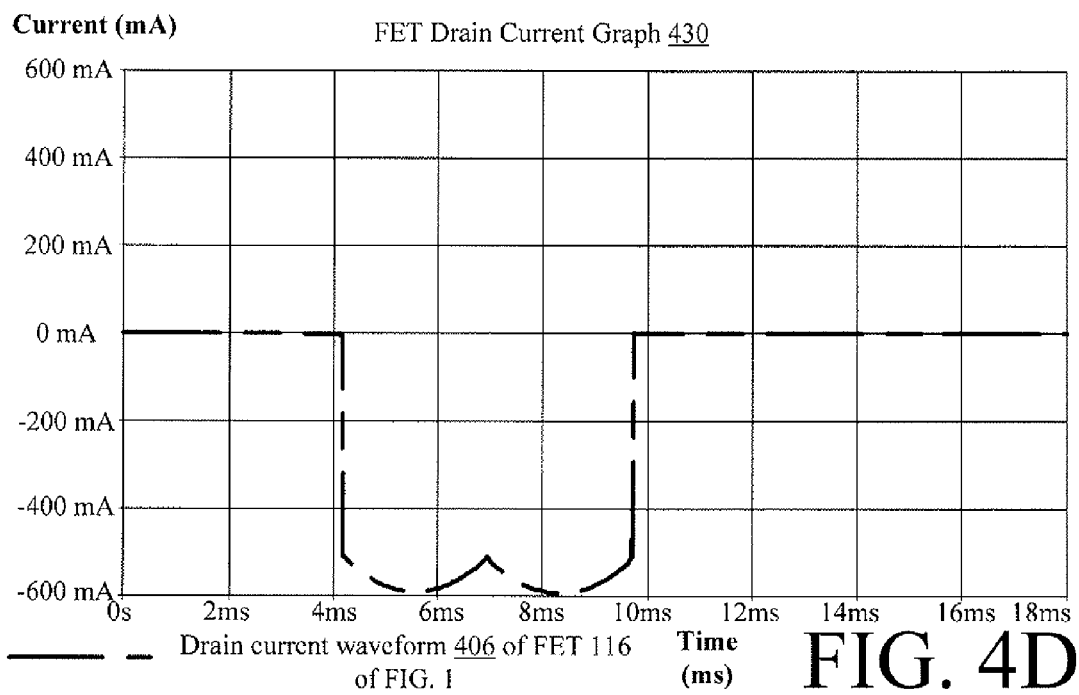
FIG. 4D is a time graph showing an exemplary drain current waveform for a field effect transistor shown in FIG. 1.
Figure 4E:
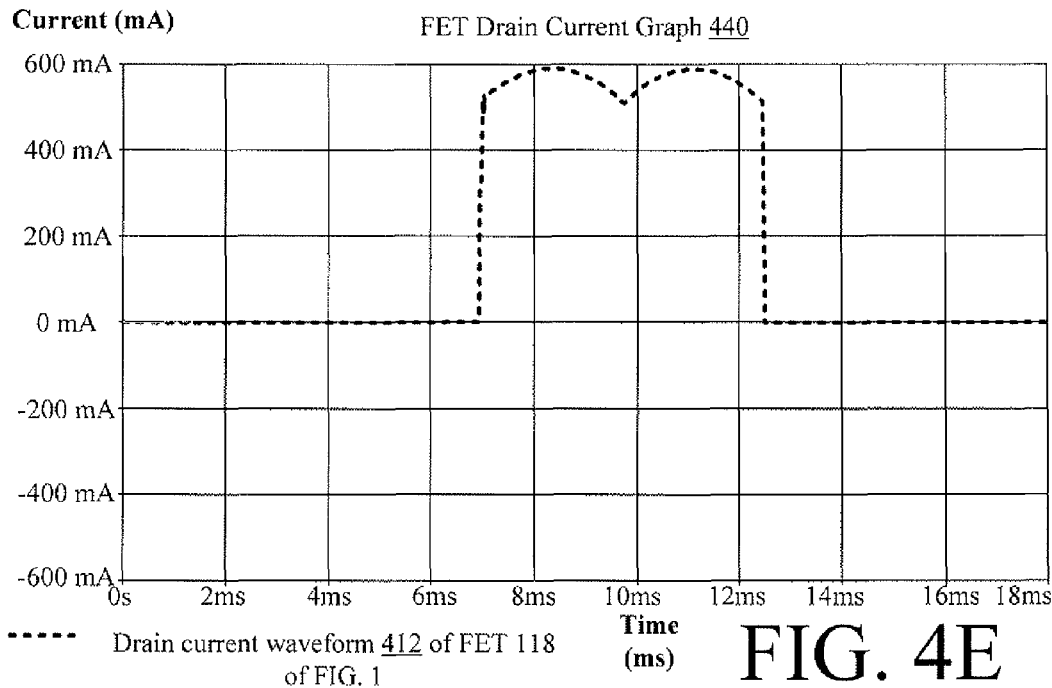
FIG. 4E is a time graph showing an exemplary drain current waveform for a field effect transistor shown in FIG. 1.
Figure 4F:
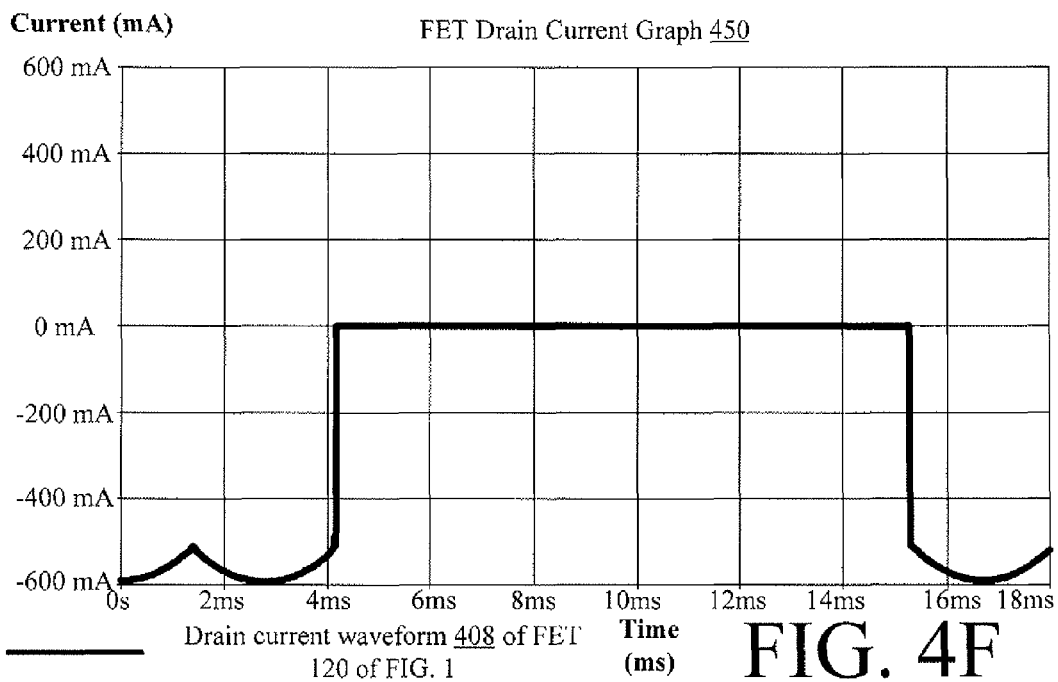
FIG. 4F is a time graph showing an exemplary drain current waveform for a field effect transistor shown in FIG. 1.

The operation of the circuit 100 will now be described in detail in relation to FIGS. 1-7D. When AC voltage waveforms (e.g., AC voltage waveforms 302, 304 and 306 of FIGS. 3 and 6E) are applied to circuit 100 via input lines 151, 153 and 155, only one (1) P-channel MOSFET 110, 114, 118 will be switched to its "on" state at any given time. This P-channel MOSFET on/off switching scheme is illustrated by the FET drain current graphs 400, 410, 420, 430, 440, 450 and 460 of FIGS. 4A-4G. Each of the FET drain current time graphs 400, 410, 420, 430, 440, 450 shows a respective drain current waveform 402, 404, 409, 406, 412, 408. It should be noted that FIG. 4G shows the drain current waveforms 402, 404, 409, 406, 412, 408 of FIGS. 4A-4F overlapping each other.

As shown in FIG. 4G, the field effect transistor 110 is switched to its "on" state at a time $t_a$ and switched to its "off" state at a time $t_c$ as illustrated by the drain current waveform 402. At the time $t_c$, the field effect transistor 118 is switched to its "on" state as illustrated by the drain current waveform 412. The field effect transistor 118 is switched to its "off" state at a time $t_e$ as also illustrated by the drain current waveform 412. At the time $t_e$, the field effect transistor 114 is switched to its "on" state as illustrated by the drain current waveform 409. The field effect transistor 114 is turned "off" at a time $t_g$ as also illustrated by the drain current waveform 409. This "on/off" state switching process of the P-channel MOSFETs 110, 114, 118 is repeated until the AC voltage source(s) 102, 104, 106 cease(s) supplying AC voltage waveforms (e.g., AC voltage waveforms 302, 306 and 304 of FIG. 3) to the circuit 100.

Similarly, only (1) N-channel MOSFET 112, 116, 120 will be switched to its "on" state at any given time. This N-channel MOSFET on/off switching scheme is also illustrated by the FET drain current graph 460 of FIG. 4G. As shown in FIG. 4G, the field effect transistor 120 is switched to its "on" state at a particular time (not shown) and switched to its "off" state a time $t_b$ as illustrated by the drain current waveform 408. At time $t_b$, the field effect transistor 116 is switched to its "on" state as illustrated by the drain current waveform 406. The field effect transistor 116 is switched to its "off" state at time $t_d$ as also illustrated by the drain current waveform 406. At time $t_d$, the field effect transistor 112 is switched to its "on" state as illustrated by the drain current waveform 404. The field effect transistor 112 is switched to its "off" state at time $t_f$ as also illustrated by the drain current waveform 404. This "on/off" state switching process of the N-channel MOSFET 112, 116, 120 is repeated until the AC voltage source(s) 102, 104, 106 cease(s) supplying AC voltage waveforms (e.g., AC voltage waveforms 302, 306 and 304 of FIG. 3) to the circuit 100.

As further shown by the graph 460 of FIG. 4G, the P-channel MOSFETs 110, 114, 118 of each series connected transistor pair 110/112, 114/116, 118/120 are switched to their "off" states before the N-channel MOSFETs 112, 116, 120 are switched to their "on" states, respectively. For example, the field effect transistor 110 is switched to its "off" state and remains in its "off" state before the field effect transistor 112 is switched to its "on" state, and vise versa. Similarly, the field effect transistor 114 is switched to its "off" state and remains in its "off" state before the field effect transistor 116 is switched to its "on" state, and vise versa. Likewise, the field effect transistor 118 is switched to its "off" state and remains in its "off" state before the field effect transistor 120 is switched to its "on" state, and vise versa. In effect, cross conduction of the series connected transistor pairs 110/112, 114/116, 118/120 does not occur during the "on/off" state transitions thereof.

Figure 6A:
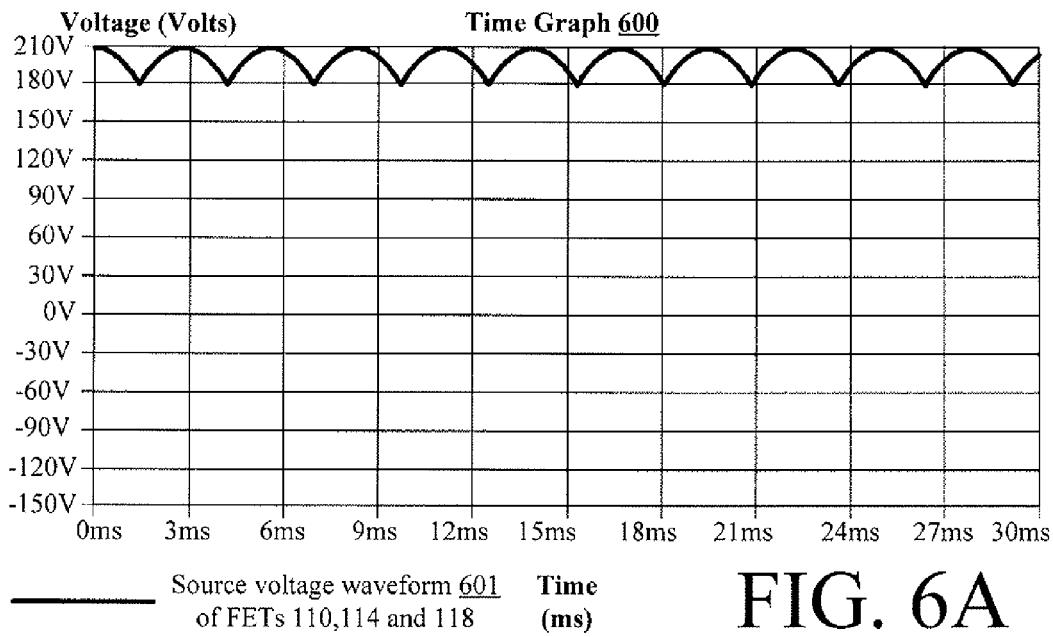
FIG. 6A is a time graph showing a source voltage waveform of field effect transistors shown in FIG. 1.
Figure 6B:
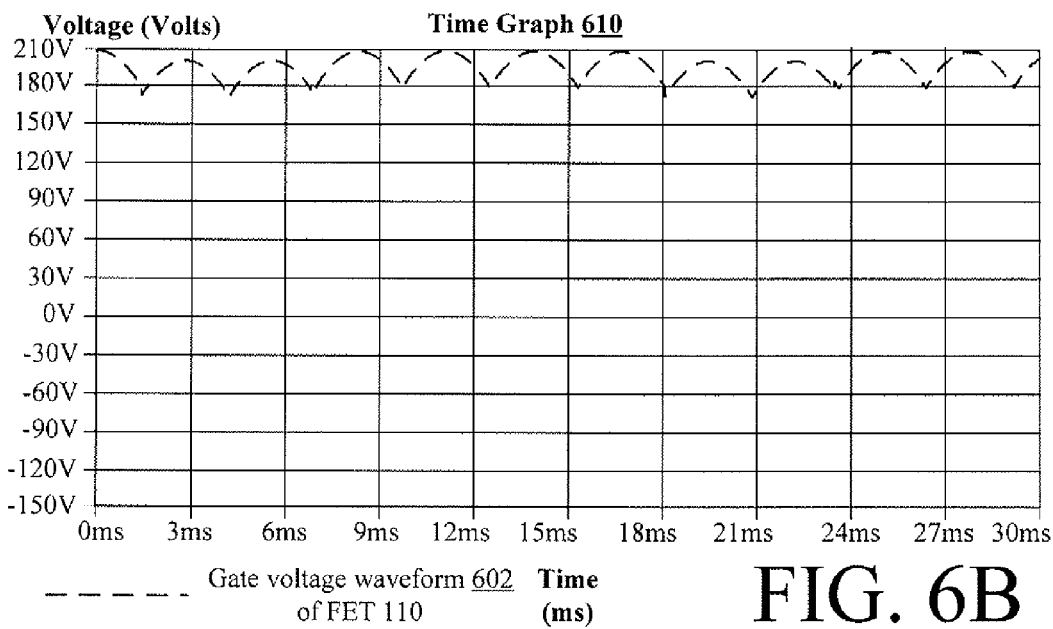
FIG. 6B is a time graph showing a gate voltage waveform of a field effect transistor shown in FIG. 1.
Figure 6C:
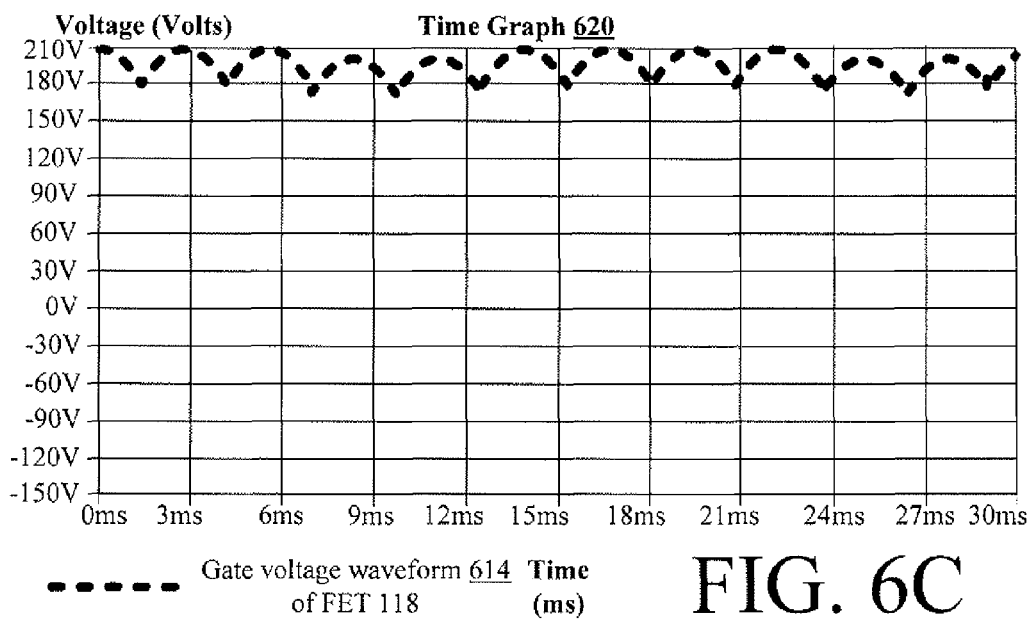
FIG. 6C is a time graph showing a gate voltage waveform of a field effect transistor shown in FIG. 1.
Figure 6D:
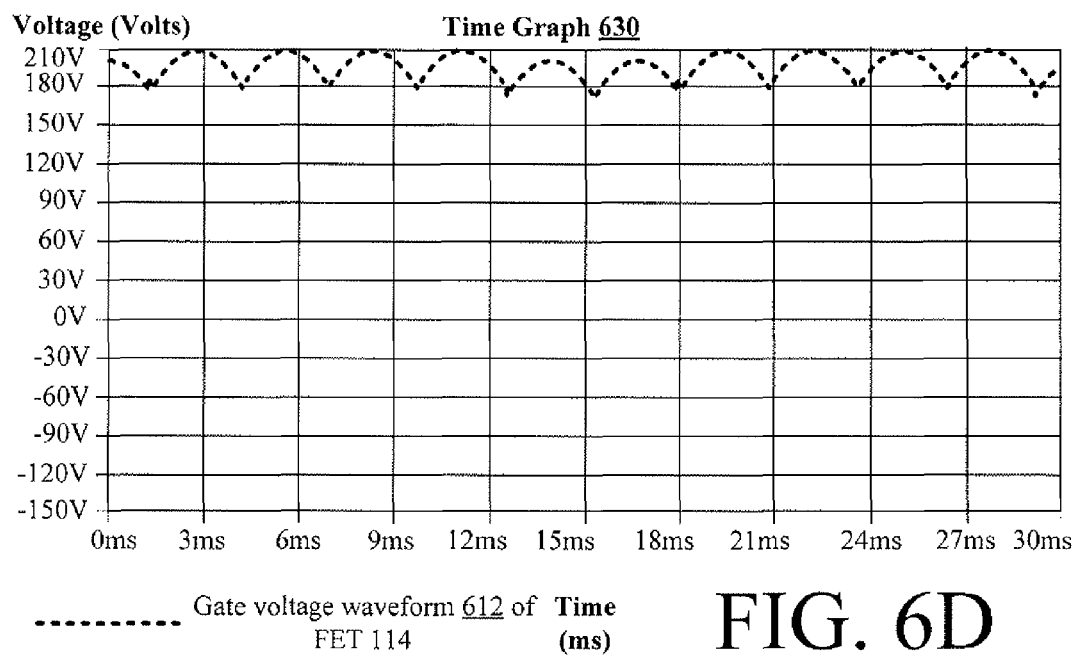
FIG. 6D is a time graph showing a gate voltage waveform of a field effect transistor shown in FIG. 1.

Notably, the FET "on/off" state transition process described above is at least partially defined by the polarity of the AC voltage waveforms (e.g., AC voltage waveforms 302, 304 and 306 of FIGS. 3 and 6E) and the intersection of the AC voltage waveforms as shown by the time graph 650 of FIG. 6E. It should be noted that FIG. 6E shows the voltage waveforms 601, 602, 614, 612 of FIGS. 6A-6D overlapping each other. FIG. 6E also shows the AC voltage waveforms 302, 304, 306 of FIG. 3 over lapping each other.

As shown in FIG. 6E, if the AC input voltage waveform 302 has a positive polarity, then the field effect transistor 110 is switched to its "on" state at time $t_a$. Time $t_a$ represents when a rising edge of a positive polarity portion of the AC input voltage waveform 302 and a falling edge of a positive polarity portion of the AC input voltage waveform 306 intersect. Similarly, if the AC input voltage waveform 304 has a positive polarity, then the field effect transistor 118 is switched to its "on" state at time $t_c$. Time $t_c$ represents when a rising edge of a positive polarity portion of the AC input voltage waveform 304 and a falling edge of a positive polarity portion of the AC input voltage waveform 302 intersect. Likewise, if the AC input voltage waveform 306 has a positive polarity, then the field effect transistor 114 is switched to its "on" state at time $t_e$. Time $t_e$ represents when a rising edge of a positive polarity portion of the AC input voltage waveform 306 and a falling edge of a positive polarity portion of the AC input voltage waveform 304 intersect. As should be understood, each field effect transistor 110, 114, 118 is switched to its "on" state when a gate-to-source voltage $V_{gs}$ is less than a threshold gate-to-source voltage $V_{gs\_th}$.

Figure 7A:
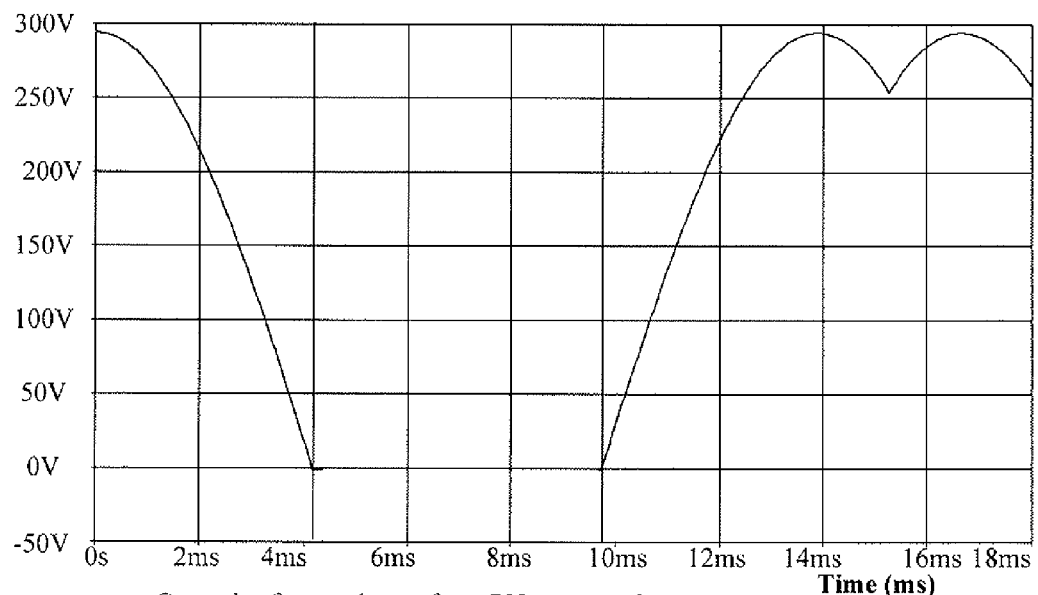
FIG. 7A is a time graph showing a first ground-referenced waveform measured at a drain of a field effect transistor shown in FIG. 1.
Figure 7B:
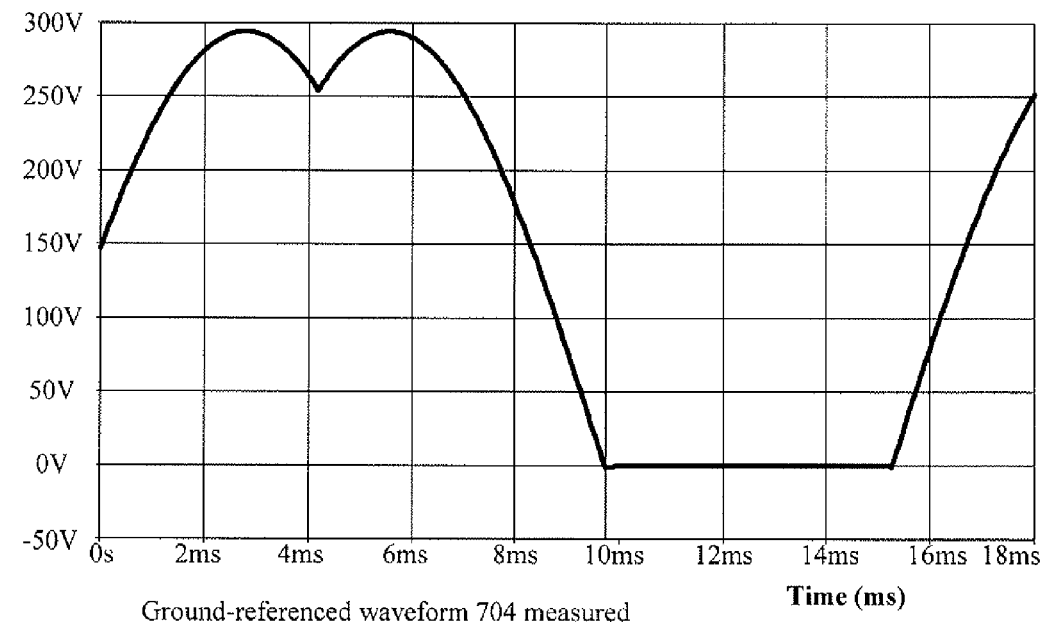
FIG. 7B is a time graph showing a second ground-referenced waveform measured at a drain of a field effect transistor shown in FIG. 1.
Figure 7C:
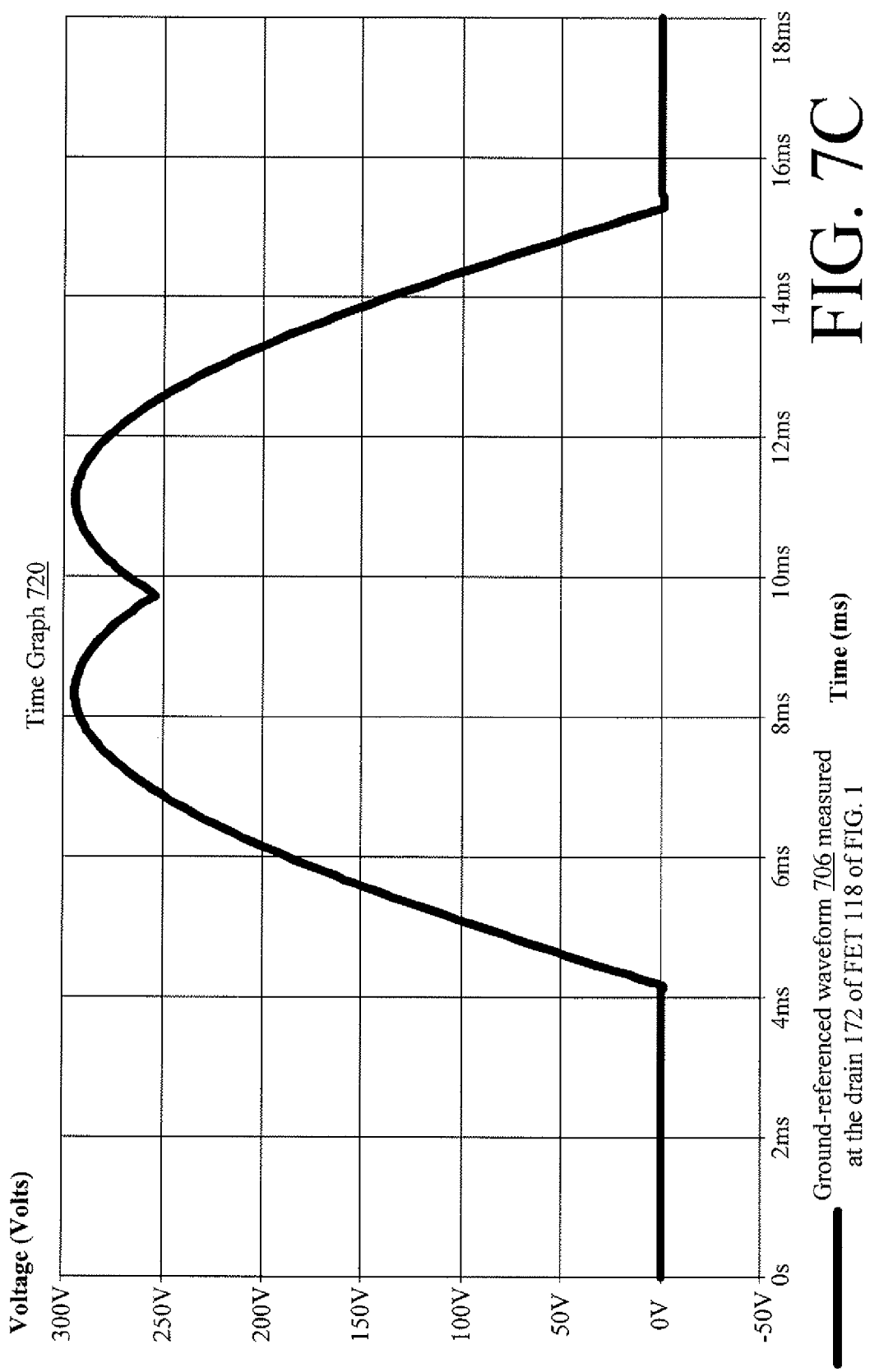
FIG. 7C is a time graph showing a third ground-referenced waveform measured at a drain of a field effect transistor shown in FIG. 1.
Figure 7D:
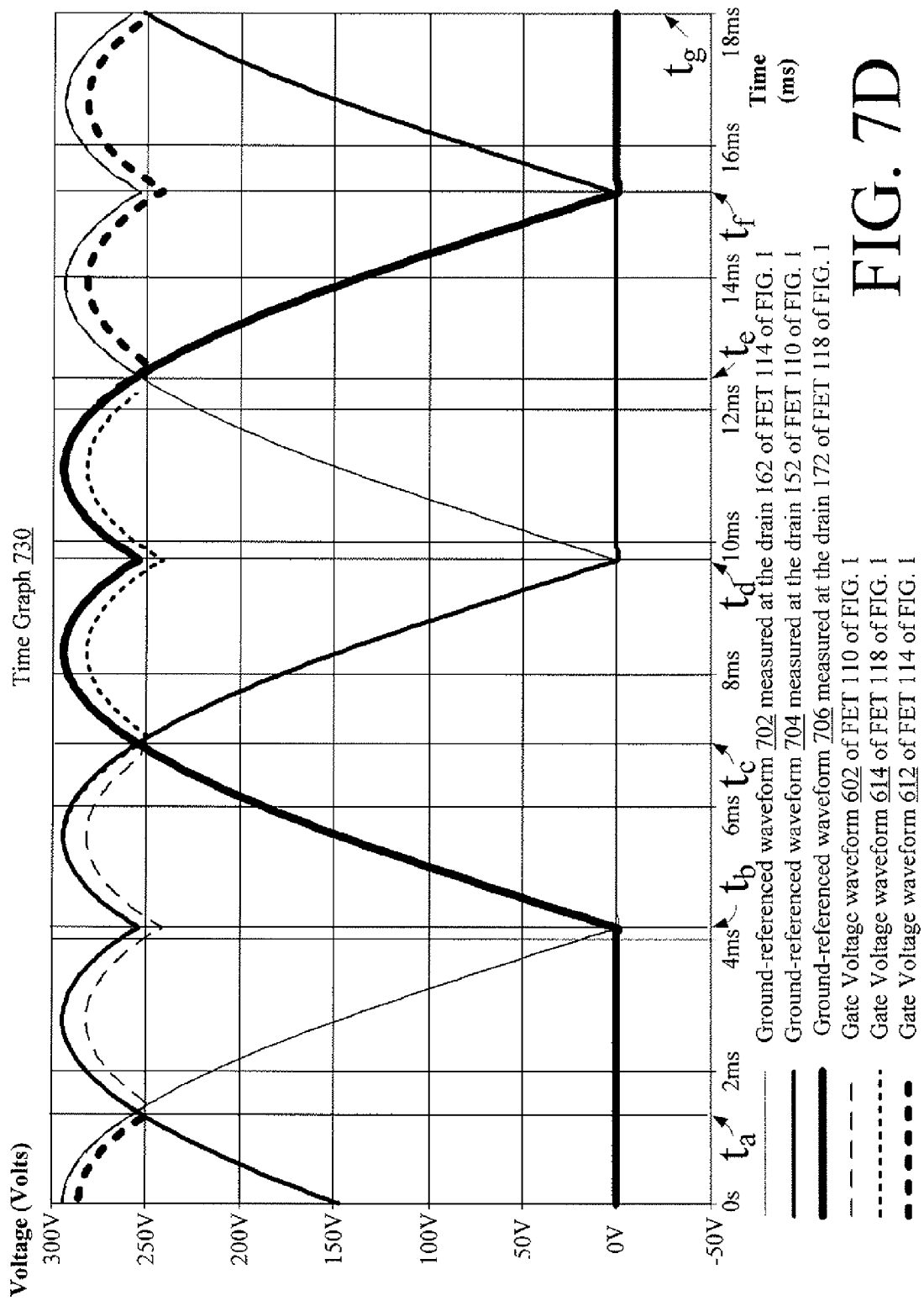
FIG. 7D is a time graph showing that a FET "on/off" state transition process is achieved with the use of three (3) ground-referenced waveforms.

The FET "on/off" state transition process described above is achieved with the use of three (3) ground-referenced waveforms 702, 704, 706 shown in time graphs 700, 710, 720 of FIGS. 7A-7C and the diodes 190, 128, 198, 148, 113, 168 shown in FIG. 1. Each of the time graphs 700, 710, 720 shows a respective ground-referenced waveform 702, 704, 706. It should be noted that FIG. 7D shows the ground-referenced waveforms 702, 704, 706 of FIGS. 7A-7C overlapping each other. FIG. 7D also shows the gate voltage waveforms 602, 612, 614 of FIGS. 6B-6D overlapping each other.

As shown in FIG. 7D, the first ground-referenced waveform 702 is an input voltage waveform supplied to the circuit 100 and measured at the drain 162 of the field effect transistor 114. The second ground-referenced waveform 704 is an input voltage waveform supplied to the circuit 100 and measured at the drain 152 of the field effect transistor 110. The third ground-referenced waveform 706 is an input voltage waveform supplied to the circuit 100 and measured at the drain 172 of the field effect transistor 118. As noted above, the field effect transistor 110 is switched to its "on" state at time $t_a$ and switched to its "off" state at time $t_c$. The field effect transistor 118 is switched to its "on" state at time $t_c$ and switched to its "off" state at time $t_e$. The field effect transistor 114 is switched to its "on" state at time $t_e$ and switched to its "off" state at time $t_g$.

As shown in FIG. 7D, time $t_a$ represents the time when a falling edge of the first ground-referenced waveform 702 intersects a rising edge of the second ground-referenced waveform 704. Notably, the field effect transistor 110 does not conduct during time $t_c$-$t_e$, i.e., when the ground-referenced waveform 706 has voltage values greater than those of the ground-referenced waveforms 702, 704. It should also be noted that the diode 190 of FIG. 1 is connected electrically between the drain 162 of the field effect transistor 114 and the gate 154 of the field effect transistor 110. The diode 190 is provided to ensure that the field effect transistor 110 does not conduct during the period of time $t_e$-$t_a$. During the period of time $t_e$-$t_a$, current is allowed to flow from the AC voltage source 104 through the diode 190 to the gate 154 of the field effect transistor 110. In effect, the voltage at the gate 154 of the field effect transistor 110 is non-negative relative to its source voltage. Consequently, the field effect transistor 110 remains in its "off" outside the region of interest $t_a$-$t_c$. In its "off state", the field effect transistor 110 does not conduct, i.e., a drain-to-source current $I_{ds}$ is approximately zero (0).

The field effect transistor 110 is switched to its "on" state when the falling edge of the first ground-referenced waveform 702 intersects the rising edge of the second ground-referenced waveform 704. The field effect transistor 110 remains in its "on" state during the region of interest $t_a$-$t_c$, i.e., until the voltage values of the third ground-referenced waveform 706 are greater than the voltage values of the second ground-referenced waveform 704. During its "on" state, the voltage at the gate 154 of the field effect transistor 110 is negative relative to its source voltage. Notably, the field effect transistor 110 self-biases through its body diode so that a negative $V_{gs}$ is allowed to develop in the resistor divider. Also, during its "on" state, the drain-to-source current $I_{ds}$ flows via conducting channel that connects the drain 152 to the source 156 of the field effect transistor 110. The conductivity of the field effect transistor 110 is varied by the electric field that is produced when a voltage is applied between the gate 154 and source 156 thereof. Hence, current flowing between the drain 152 and source 156 is controlled by the voltage applied between the gate 154 and source 156.

As also shown in FIG. 7D, time $t_c$ represents the time when a falling edge of the second ground-referenced waveform 704 intersects the rising edge of the third ground-referenced waveform 706. Notably, the field effect transistor 118 does not conduct during the time $t_e$-$t_g$, i.e., when the ground-referenced waveform 702 have voltage values greater than those of the ground-referenced waveforms 704 and 706. It should also be noted that the diode 113 of FIG. 1 is connected electrically between the drain of the field effect transistor 110 and the gate 174 of the field effect transistor 118. The diode 113 is provided to ensure that the field effect transistor 118 does not conduct during the period of time $t_a$-$t_c$. During the period of time $t_a$-$t_c$, current is allowed to flow from the AC voltage source 102 through the diode 113 to the gate 174 of the field effect transistor 118. In effect, the voltage at the gate 174 of the field effect transistor 118 is non-negative relative to its source voltage. Consequently, the field effect transistor 118 remains in its "off" state outside the region of interest $t_c$-$t_e$. In its "off" state, the field effect transistor 118 does not conduct, i.e., a drain-to-source current $I_{ds}$ is approximately zero (0).

The field effect transistor 118 is switched to its "on" state when the falling edge of the second ground-referenced waveform 704 intersects the rising edge of the third ground-referenced waveform 706. The field effect transistor 118 remains in its "on" state during the region of interest $t_c$-$t_e$, i.e., until the voltage values of the first ground-referenced waveform 702 are greater than the voltage values of the third ground-referenced waveform 706. During its "on" state, the voltage at the gate 174 of the field effect transistor 118 is negative relative to its source voltage. Notably, the field effect transistor 118 self-biases through its body diode so that a negative $V_{gs}$ is allowed to develop in the resistor divider. Also, during its "on" state, the drain-to-source current $I_{ds}$ flows via conducting channel that connects the drain 172 to the source 176 of the field effect transistor 118. The conductivity of the field effect transistor 118 is varied by the electric field that is produced when a voltage is applied between the gate 174 and source 176 thereof. Hence, current flowing between the drain 172 and source 176 is controlled by the voltage applied between the gate 174 and source 176.

As further shown in FIG. 7D, time $t_e$ represents the time when the falling edge of the third ground-referenced waveform 706 intersects the rising edge of the first ground-referenced waveform 702. Time $t_g$ represents the time when the falling edge of the first ground-referenced waveform 702 intersects the rising edge of the second ground-referenced waveform 704. Notably, the field effect transistor 114 does not conduct during time $t_g$-$t_i$ (not shown in FIG. 7D), i.e., when the ground-referenced waveform 704 has voltage values greater than those of ground-referenced waveforms 702 and 706. It should also be noted that the diode 198 of FIG. 1 is connected electrically between the drain 172 of the field effect transistor 118 and the gate 164 of the field effect transistor 114. The diode 198 is provided to ensure that the field effect transistor 114 does not conduct during the period of time $t_i$ (not shown in FIG. 7D)-$t_e$. During the period of time $t_i$ (not shown in FIG. 7D)-$t_e$, current is allowed to flow from the AC voltage source 106 through the diode 198 to the gate 164 of the field effect transistor 114. In effect, the voltage at the gate 164 of the field effect transistor 114 is non-negative relative to its source voltage. Consequently, the field effect transistor 114 remains in its "off" state outside the region of interest $t_e$-$t_g$. In its "off" state, the field effect transistor 114 does not conduct, i.e., a drain-to-source current $I_{ds}$ is approximately zero (0).

The field effect transistor 114 is switched to its "on" state when the falling edge of the ground-referenced waveform 706 intersects the rising edge of the ground-referenced waveform 702. The field effect transistor 114 remains in its "on" state during the region of interest $t_e$-$t_g$, i.e., until the voltage values of the ground-referenced waveform 704 are greater than the voltage values of the ground-referenced waveform 702. During its "on" state, the voltage at the gate 164 of the field effect transistor 114 is negative relative to its source voltage. Notably, the field effect transistor 114 self-biases through its body diode so that a negative $V_{gs}$ is allowed to develop in the resistor divider. Also, during its "on" state, the drain-to-source current $I_{ds}$ flows via conducting channel that connects the drain 162 to the source 166 of the field effect transistor 114. The conductivity of the field effect transistor 114 is varied by the electric field that is produced when a voltage is applied between the gate 164 and source 166 thereof. Hence, current flowing between the drain 162 and source 166 is controlled by the voltage applied between the gate 164 and source 166.

It should be understood that the N-channel field effect transistors 112, 116, 120 are switched to their "on" states when a gate-to-source voltage $V_{gs}$ is greater than a threshold gate-to-source voltage $V_{gs\_th}$. With reference to FIGS. 4G and 7D, it should be understood that the field effect transistor 116 is switched to its "on" state when the falling edge of the first ground-referenced waveform 702 intersects the rising edge of the third ground-referenced waveform 706. The field effect transistor 116 remains in its "on" state during the region of interest $t_b$-$t_d$, i.e., until the voltage values of the first ground-referenced waveform 702 exceed the voltage values of the second ground-referenced waveform 704. Likewise, the field effect transistor 112 is switched to its "on" state when the falling edge of the second ground-referenced waveform 704 intersects the rising edge of the first ground-referenced waveform 702. The field effect transistor 112 remains in its "on" state during the region of interest $t_d$-$t_f$, i.e., until the voltage values of the second ground-referenced waveform 704 exceed the voltage values of the third ground-referenced waveform 706. Similarly, the field effect transistor 120 is switched to its "on" state when the falling edge of the third ground-referenced waveform 706 intersects the rising edge of the second ground-referenced waveform 704. The field effect transistor 120 remains in its "on" state during the region of interest $t_r$-$t_h$ (not shown in FIG. 7D), i.e., until the voltage values of the third ground-referenced waveform 706 exceed the voltage values of the first ground-referenced waveform 702.

When a field effect transistor 110, 112, 114, 116, 118, 120 is switched to its "on" state, a relatively low resistance path is created between a drain 152, 122, 162, 132, 172, 142 and source 156, 126, 166, 136, 176, 146 thereof. The exact amount of this resistance will depend upon several factors, including the specified drain-source "on" state resistance of the field effect transistors 110, 112, 114, 116, 118, 120. For example, "on" state resistance values of between half a milliohm (0.5 mΩ) and ten Ohm (10Ω) are typical for such devices. Generally, P-channel devices have a slightly higher resistance as compared to N-channel devices. Once turned on, however, current will continue to flow between the drain 152, 122, 162, 132, 172, 142 and source 156, 126, 166, 136, 176, 146 of the field effect transistor 110, 112, 114, 116, 118, 120 through the low resistance path, thereby eliminating a voltage drop associated with a body diode 206, 208 thereof. Consequently, if the load 199 is connected across output lines 159, 157, then the voltage drop caused by the field effect transistors 110, 112, 114, 116, 118, 120 of circuit 100 can be considerably less than the typical diode drop associated with a conventional three-phase bridge rectifier circuit (such as circuit 900 shown in FIG. 9).

If an AC input voltage applied on an input line 151, 153, 155 is sufficiently high, it will exceed a reverse breakdown voltage of a zener diode 194, 138, 109, 158, 119, 178 associated with the field effect transistor 110, 112, 114, 116, 118, 120. This will cause the zener diode 194, 138, 109, 158, 119, 178 to clamp the voltage applied across the gate-to-source terminals of the field effect transistor 110, 112, 114, 116, 118, 120.

Figure 8A:
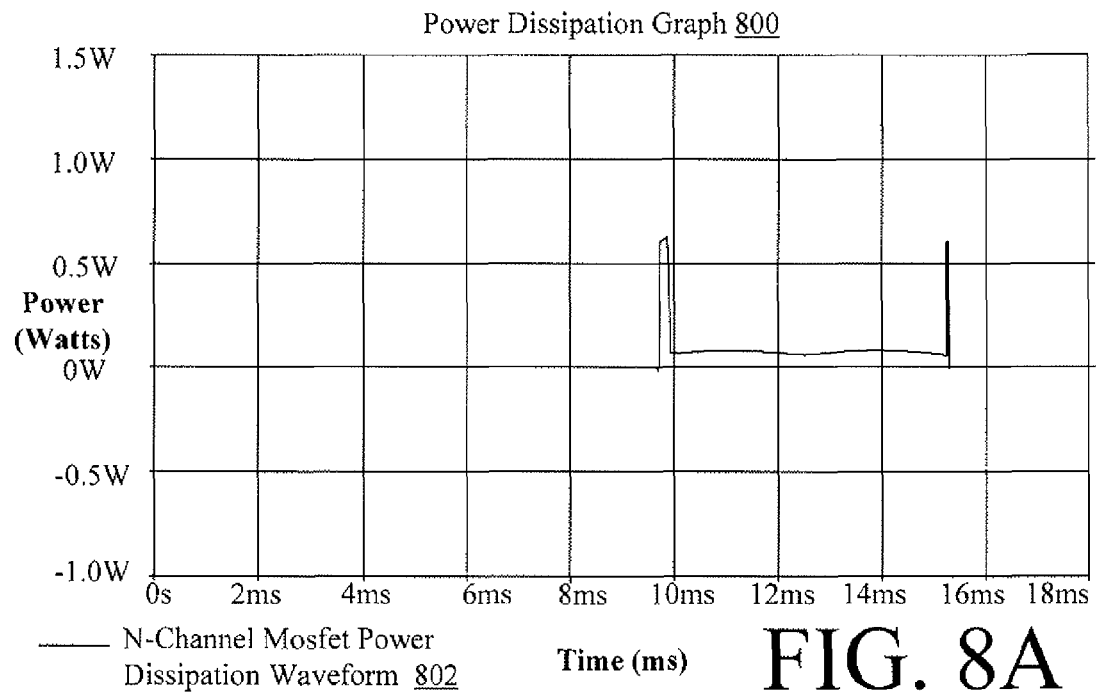
FIG. 8A is a time graph showing a power dissipation waveform for an N-channel MOSFET of FIG. 1.
Figure 8B:
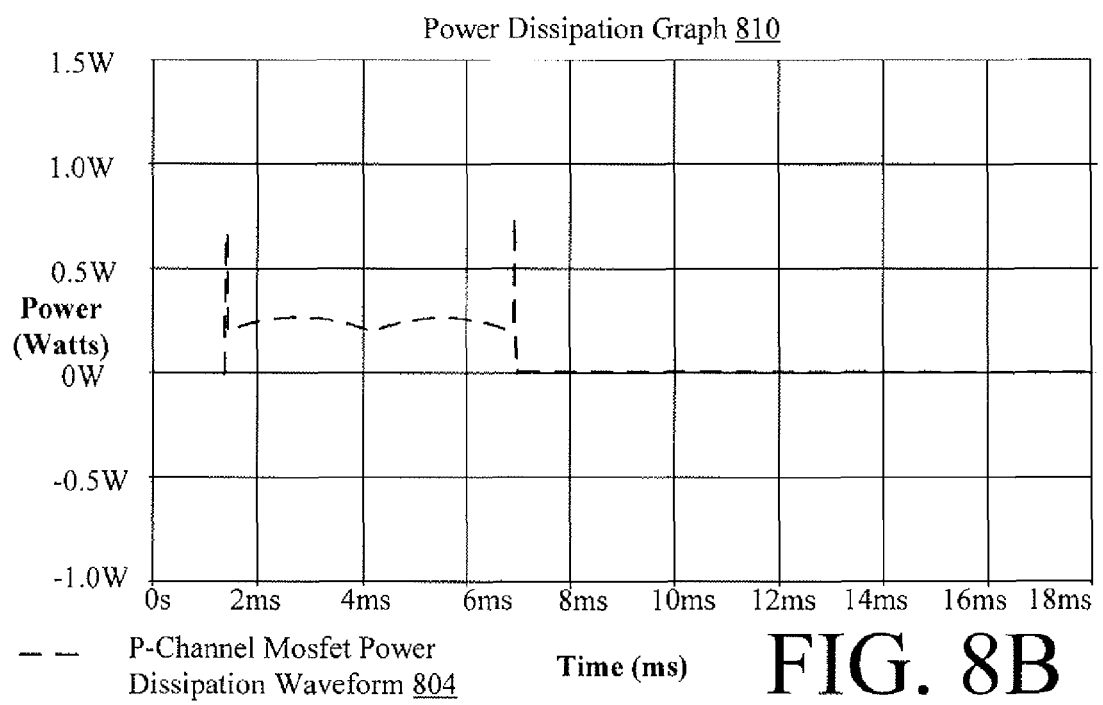
FIG. 8B is a time graph showing a power dissipation waveform for a P-channel MOSFET of FIG. 1.
Figure 8C:
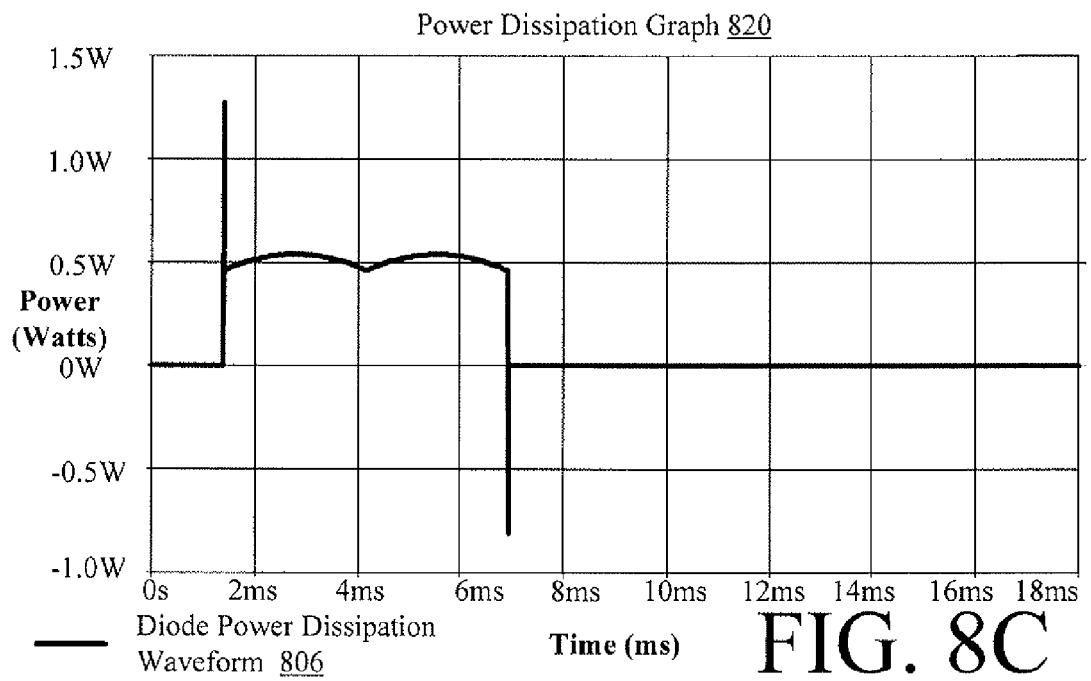
FIG. 8C is a time graph showing a power dissipation waveform for a diode of a conventional three-phase bridge rectifier circuit.
Figure 8D:
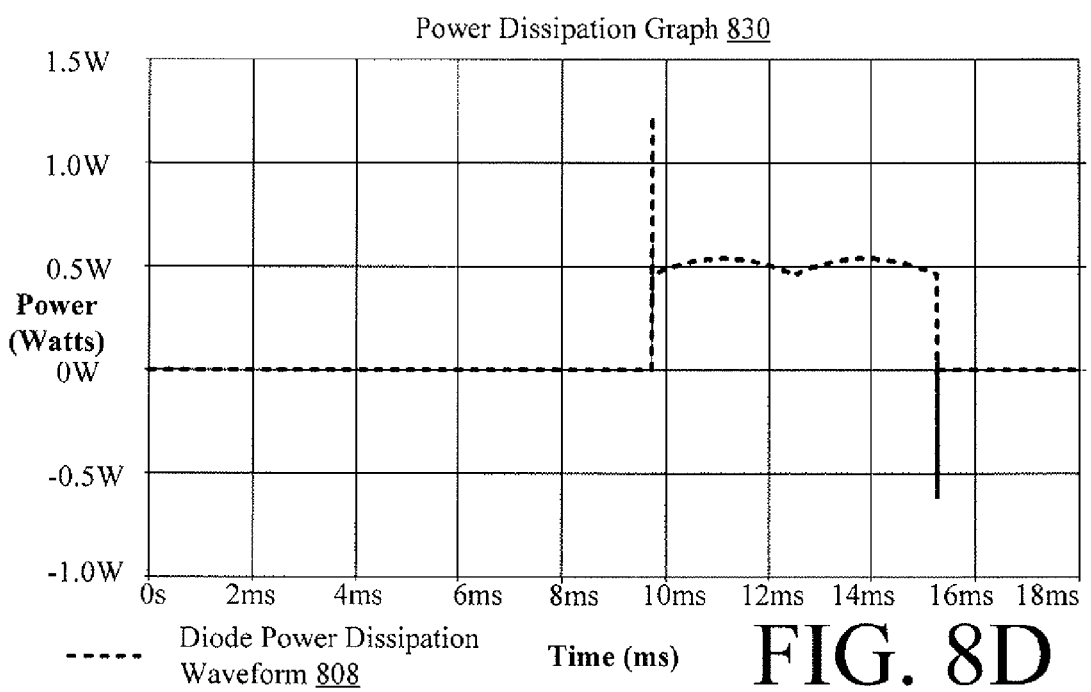
FIG. 8D is a time graph showing a power dissipation waveform for a diode of a conventional three-phase bridge rectifier circuit.
Figure 9:
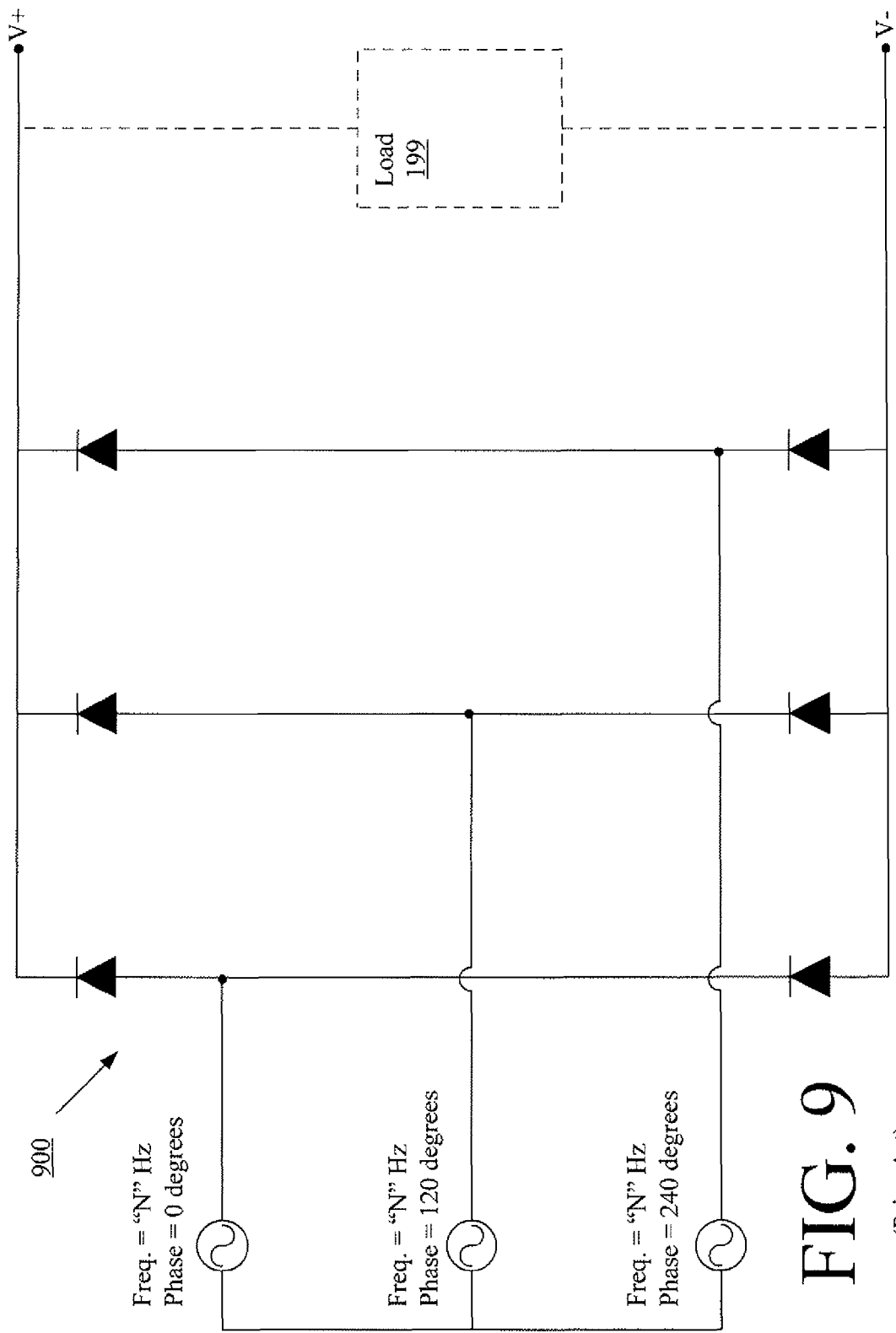
FIG. 9 is a schematic illustration of a conventional three-phase bridge rectifier circuit.

Referring now to FIGS. 8A-8E, there are provided power dissipation time graphs 800, 810, 820, 830, 840 that are useful for understanding certain advantages of the present invention. Each of the time graphs 800, 810, 820, 830 shows a respective power dissipation waveform 802, 804, 806, 808. It should be noted that FIG. 8E shows the waveforms 802, 804, 806, 808 of FIGS. 8A-8D overlapping each other. As shown in FIGS. 8A-8E, the first power dissipation waveform 802 represents power dissipated in an N-channel MOSFET of the circuit 100 with a load 199 connected thereto. The second power dissipation waveform 804 represents power dissipated in a P-channel MOSFET of the circuit 100 with the load 199 connected thereto. Each of the third and fourth power dissipation waveforms 806, 808 represents power dissipated in a diode of a conventional three-phase bridge rectifier circuit 900 with the load 199 connected thereto as shown in FIG. 9.

As evidenced by the power dissipation time graph 840 of FIG. 8E, the amount of power dissipated in the field effect transistors of circuit 100 is substantially less than the power dissipated in the diodes of the conventional three-phase bridge rectifier circuit 900. For example, the power dissipated in the field effect transistors of circuit 100 can be reduced by fifty percent or more (>50%) as compared to the power dissipated in the diodes of the conventional three-phase bridge rectifier circuit 900. Notably, circuit 100 can be modified so as to decrease the amount of power dissipated in the field effect transistors than that shown in FIG. 8E. For example, the power dissipated in circuit 100 can be further reduced if one or more field effect transistors are connected in parallel with the field effect transistors 110, 112, 114, 116, 118, 120. The power dissipated in circuit 100 can also be further reduced if field effect transistors with relatively low drain-to-source "on" state resistances $R_{DSon}$ are employed.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A three-phase bridge rectifier circuit connectable to at least one AC voltage source via a plurality of input lines and to a load via a pair of output lines, said at least one AC voltage source configured to supply said three-phase bridge rectifier circuit with a plurality of AC voltage waveforms that differ in phase by a certain amount, said three-phase bridge rectifier circuit comprising:
   a first and second field effect transistor, a source-drain path of said first field effect transistor connected in series with a source-drain path of said second field effect transistor to form a first series transistor combination connected across said pair of output lines;
   a third and fourth field effect transistor, a source-drain path of said third field effect transistor connected in series with a source-drain path of said fourth field effect transistor to form a second series transistor combination connected across said pair of output lines;
   a fifth and sixth field effect transistor, a source-drain path of said fifth field effect transistor connected in series with a source-drain path of said sixth field effect transistor to form a third series transistor combination connected across said pair of output lines; and
   a plurality of diodes, each connected between a drain of one of said field effect transistors and a gate of a different one of said field effect transistors.

2. The three-phase bridge rectifier circuit according to claim 1, further comprising a voltage divider provided for each of said field effect transistors, said voltage divider comprised of a first resistor and a second resistor connected in series from a source of each said field effect transistor to one of said plurality of input lines.

3. The three-phase bridge rectifier circuit according to claim 2, wherein said drain of each one of said field effect transistors is connected to a first input line of said plurality of input lines, a source of each one of said field effect transistors is connected to said first resistor, and said second resistor is connected to a second input line of said plurality of input lines.

4. The three-phase bridge rectifier circuit according to claim 1, further comprising a voltage clamping device connected between said gate and a source of each respective one of said field effect transistors.

5. The three-phase bridge rectifier circuit according to claim 1, wherein a first input line of said plurality of input lines is connected to said drains of said first and second field effect transistors, a second input line of said plurality of input lines is connected to said drains of said third and fourth field effect transistors, and a third input line of said plurality of input lines is connected to said drains of said fifth and sixth field effect transistors.

6. The three-phase bridge rectifier circuit according to claim 1, wherein said first, third and fifth field effect transistors are of a first channel type and said second, fourth and sixth field effect transistors are of a second channel type different from said first channel type.

7. The three-phase bridge rectifier circuit according to claim 1, wherein each of said field effect transistors is a MOSFET type device.

8. The three-phase bridge rectifier circuit according to claim 1, wherein each of said field effect transistors is an enhancement mode field effect transistor.

9. The three-phase bridge rectifier circuit according to claim 1, wherein each of said first, third and fifth field effect transistors is switched to its "off" state before a respective second, fourth and sixth field effect transistor is switched to its "on" state.

10. The three-phase bridge rectifier circuit according to claim 1, wherein each of said first, second, third, fourth, fifth and sixth field effect transistors is switched to its "on" state when a rising edge of a first ground-referenced waveform intersects a falling edge of a second ground-referenced waveform, wherein each of the first and second ground-referenced waveforms represent an input voltage waveform supplied to said three-phase bridge rectifier circuit.

11. A three-phase bridge rectifier circuit connectable to at least one AC voltage source via a plurality of input lines and to a load via a pair of output lines, said at least one AC voltage source configured to supply said three-phase bridge rectifier circuit with a plurality of AC voltage waveforms that differ in phase by a certain amount, said three-phase bridge rectifier circuit comprising:
  a first field effect transistor of a first channel type and a second field effect transistor of a second channel type different from said first channel type, a source-drain path of said first field effect transistor connected in series with a source-drain path of said second field effect transistor to form a first series transistor combination connected across said pair of output lines;
  a third field effect transistor of said first channel type and a fourth field effect transistor of said second channel type, a source-drain path of said third field effect transistor connected in series with a source-drain path of said fourth field effect transistor to form a second series transistor combination connected across said pair of output lines;
  a fifth field effect transistor of said first channel type and a sixth field effect transistor of said second channel type, a source-drain path of said fifth field effect transistor connected in series with a source-drain path of said sixth field effect transistor to form a third series transistor combination connected across said pair of output lines;
  a plurality of diodes, each connected between a drain of one of said field effect transistors and a gate of a different one of said field effect transistors; and
  a voltage divider provided for each of said field effect transistors, said voltage divider connected in series from a source of a respective one of said field effect transistors to one of said plurality of input lines.

12. The three-phase bridge rectifier circuit of claim 11, further comprising a plurality of voltage clamping devices each connected between said gate and a source of said respective one of said field effect transistors.

13. The three-phase bridge rectifier circuit according to claim 11, wherein said voltage divider is comprised of a first resistor and a second resistor connected in series from said source of said respective one of said field effect transistors to one of said plurality of input lines.

14. The three-phase bridge rectifier circuit according to claim 13, wherein said drain of said respective one of said field effect transistors is connected to a first input line of said plurality of input lines, a source of said respective one of said field effect transistors is connected to said first resistor, and said second resistor is connected to a second input line of said plurality of input lines.

15. The three-phase bridge rectifier circuit according to claim 11, wherein a first input line of said plurality of input lines is connected to said drains of said first and second field effect transistors, a second input line of said plurality of input lines is to said drains of said third and fourth field effect transistors, and a third input line of said plurality of input lines is connected to said drains of said fifth and sixth field effect transistors.

16. The three-phase bridge rectifier circuit according to claim 11, wherein each of said plurality of field effect transistors is a MOSFET type device.

17. The three-phase bridge rectifier circuit according to claim 11, wherein each of said plurality of field effect transistors is an enhancement mode field effect transistor.

18. The three-phase bridge rectifier circuit according to claim 11, wherein sources of said first, third, and fifth field effect transistors is connected to a first one of said pair of output lines and sources of said second, fourth and sixth field effect transistors is connected to a second one of said pair of output lines.

* * * * *